(12) United States Patent
Kobayashi

(10) Patent No.: US 10,735,670 B2
(45) Date of Patent: Aug. 4, 2020

(54) INFORMATION PROCESSING APPARATUS AND INFORMATION PROCESSING METHOD

(71) Applicant: SONY CORPORATION, Tokyo (JP)

(72) Inventor: Goh Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/076,546

(22) PCT Filed: Feb. 8, 2017

(86) PCT No.: PCT/JP2017/004530
§ 371 (c)(1),
(2) Date: Aug. 8, 2018

(87) PCT Pub. No.: WO2017/145755
PCT Pub. Date: Aug. 31, 2017

(65) Prior Publication Data
US 2019/0052816 A1  Feb. 14, 2019

(30) Foreign Application Priority Data
Feb. 22, 2016  (JP) .................. 2016-030858

(51) Int. Cl.
*H04N 5/247* (2006.01)
*G01B 11/245* (2006.01)
(Continued)

(52) U.S. Cl.
CPC ............. *H04N 5/247* (2013.01); *G01B 11/03* (2013.01); *G01B 11/245* (2013.01); *G06T 7/85* (2017.01); *G06T 2207/10012* (2013.01)

(58) Field of Classification Search
CPC ...... H04N 5/247; G01B 11/03; G01B 11/245; G06T 7/85; G06T 1/00
(Continued)

(56) References Cited

U.S. PATENT DOCUMENTS

| 2002/0018062 A1* | 2/2002 | Hamaguchi | H04N 13/239 345/419 |
| 2009/0066968 A1 | 3/2009 | Ikeda et al. | |
| 2015/0222880 A1* | 8/2015 | Choi | G03B 37/04 348/43 |

FOREIGN PATENT DOCUMENTS

| DE | 102008041524 A1 | 5/2009 |
| JP | 10-240939 A | 9/1998 |

(Continued)

OTHER PUBLICATIONS

Moezzi, et al., "Virtual View Generation for 3D Digital Video", IEEE Multimedia, Jan.-Mar. 1997, pp. 18-26.

(Continued)

Primary Examiner — Tri T Ton
(74) Attorney, Agent, or Firm — Chip Law Group

(57) ABSTRACT

The present disclosure relates to an information processing apparatus and information processing method that are aimed at enabling arrangements of a plurality of photographing devices to be easily set to an optimum arrangement for generation of three-dimensional data. An evaluation section calculates an evaluation value of an arrangement for generation of the three-dimensional data on the basis of the arrangements of the plurality of photographing devices that photograph two-dimensional image data used to generate the three-dimensional data of a photographic object. For example, the present disclosure is applicable to the information processing apparatus etc. that display information indicating the arrangements of the plurality of photographing devices that photograph the two-dimensional image data used to generate the three-dimensional data of the photographic object.

9 Claims, 25 Drawing Sheets

(51) Int. Cl.
*G06T 7/80* (2017.01)
*G01B 11/03* (2006.01)
(58) Field of Classification Search
USPC .................................................. 356/600–640
See application file for complete search history.

(56) References Cited

FOREIGN PATENT DOCUMENTS

| JP | 11-183172 A | 7/1999 |
| JP | 2009-053136 A | 3/2009 |

OTHER PUBLICATIONS

Moezzi, et al., "Virtual View Generation for 3D Digital Video", IEEE MultiMedia, Immersive Telepresence, Jan.-Mar. 1997, pp. 18-26.
International Search Report and Written Opinion of PCT Application No. PCT/JP2017/004530, dated May 9, 2017, 17 pages of ISRWO.

* cited by examiner

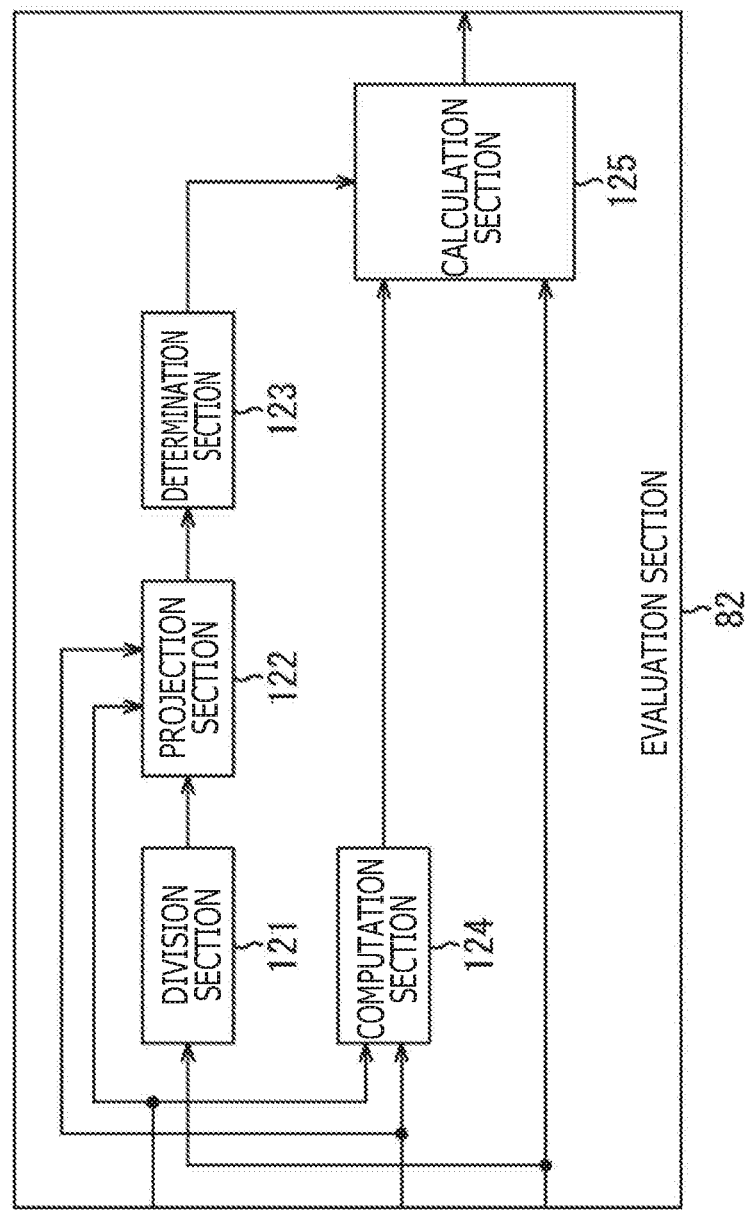

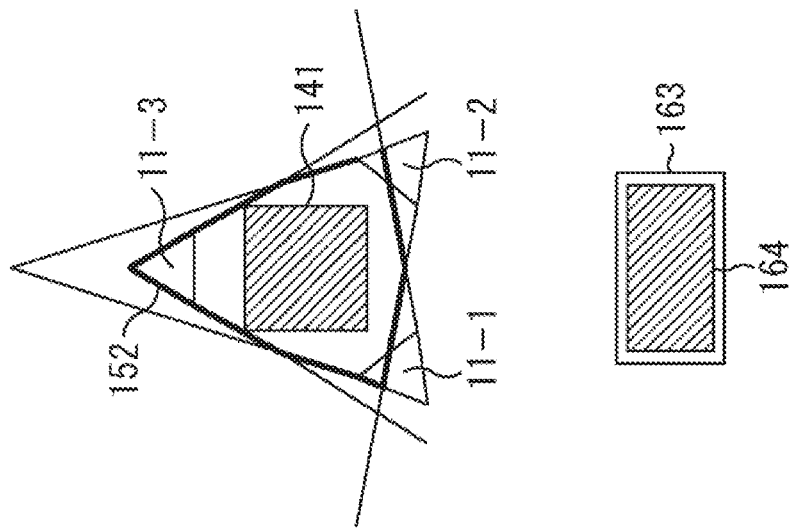
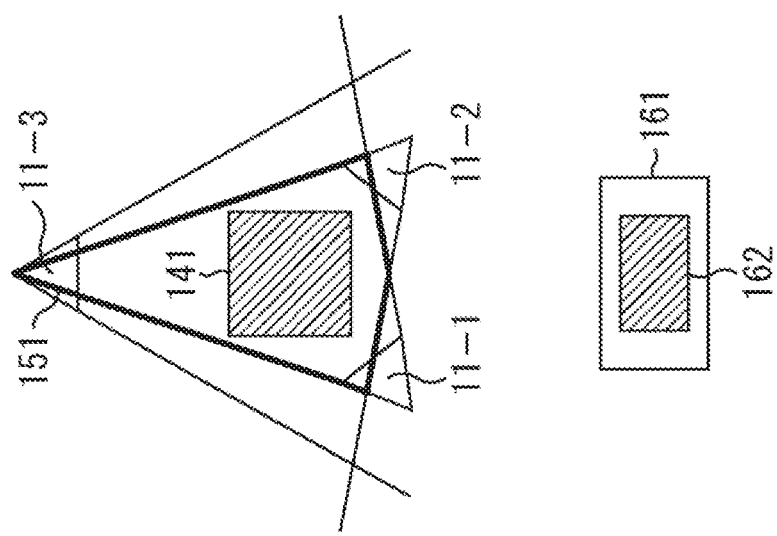

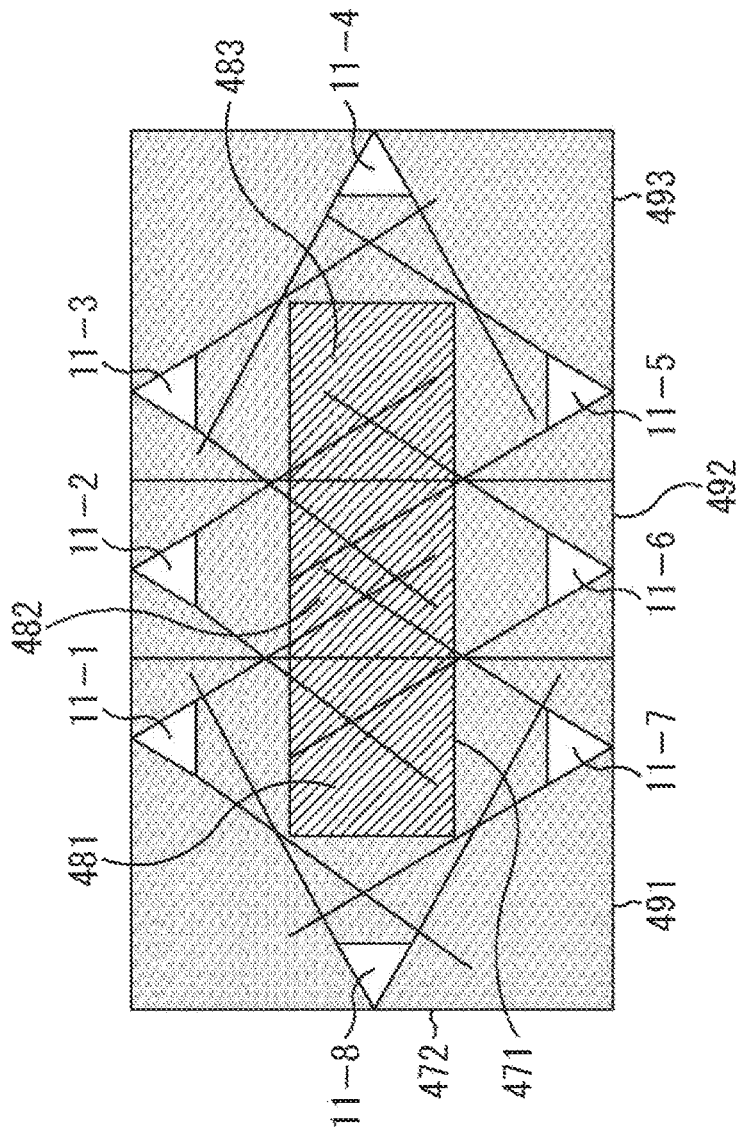

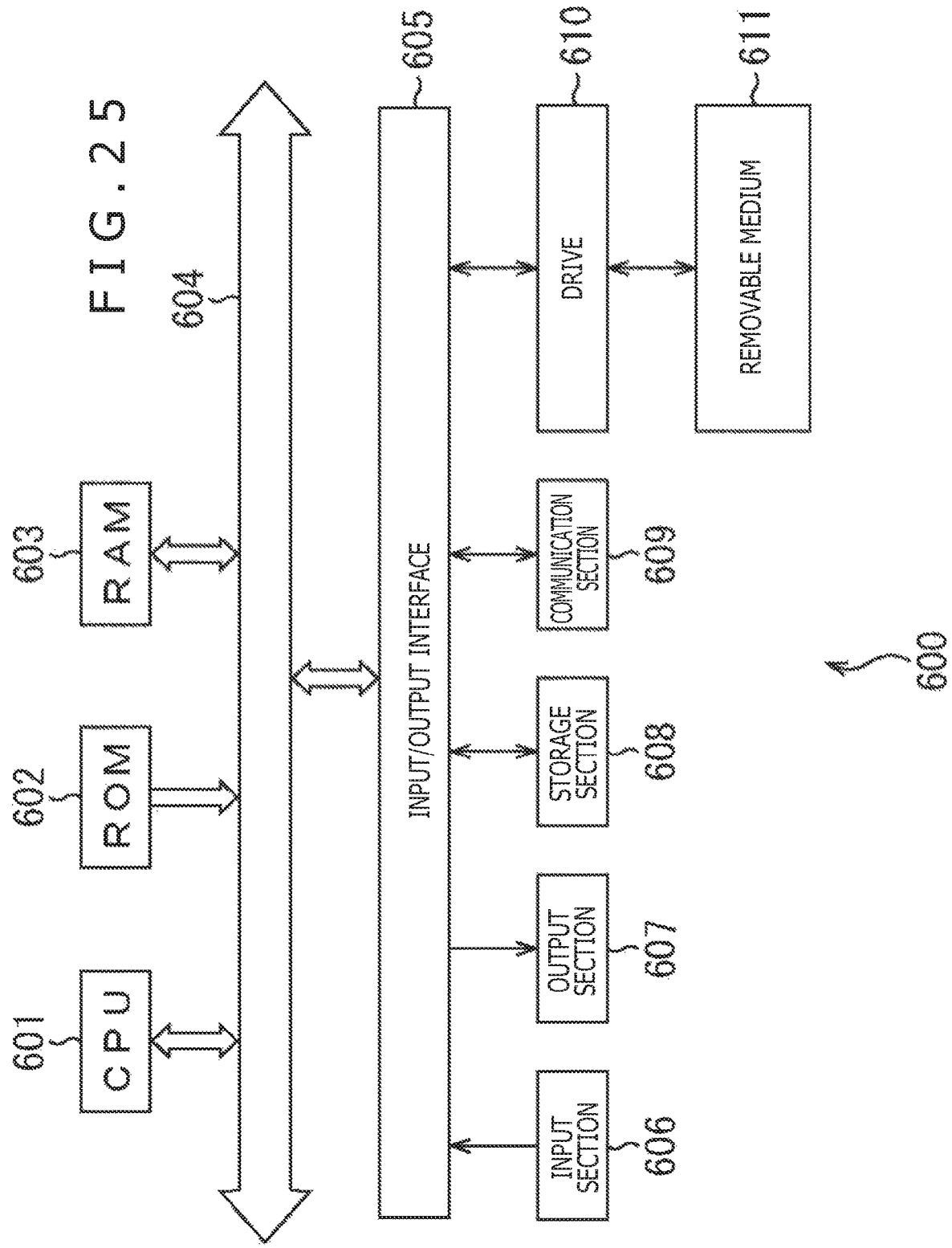

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/004530 filed on Feb. 8, 2017, which claims priority benefit of Japanese Patent Application No. JP 2016-030858 filed in the Japan Patent Office on Feb. 22, 2016. Each of the above-referenced applications is hereby incorporated herein by reference in its entirety.

TECHNICAL FIELD

The present disclosure relates to an information processing apparatus and an information processing method; and more particularly to an information processing apparatus and information processing method that are aimed at enabling arrangements of a plurality of photographing devices to be easily set to an optimum arrangement for generation of three-dimensional data.

BACKGROUND ART

There has been invented a method for generating three-dimensional data including three-dimensional position information and two-dimensional image data of a photographic object from the two-dimensional image data and depth image data having a plurality of viewpoints photographed by multiple cameras (see, for example, NPL 1).

CITATION LIST

Non Patent Literature

[NPL 1]
Saied Moezzi, Li-Cheng Tai, Philippe Gerard, "Virtual View Generation for 3D Digital Video," University of California, San Diego and Takeo Kanade and Peter Rander, P. J. Narayanan, "Virtualized Reality: Constructing Virtual Worlds from Real Scenes"

SUMMARY

Technical Problem

Arrangements of the multiple cameras used to generate the above-described three-dimensional data are generally determined on the basis of experiences of photographing of the past by a photographer. Accordingly, it is difficult to set the arrangement to the optimum arrangement for generation of the three-dimensional data. In the result, accuracy of the generated three-dimensional data is not sufficient in some cases.

In such a case, until the three-dimensional data having sufficient accuracy is obtained, the photographer need repeat works such as rearrangement, calibration of cameras, photographing, and confirmation of the accuracy of the generated three-dimensional data. Therefore, labor and time are taken.

The present disclosure has been made under the circumstances described above and is aimed at enabling arrangements of a plurality of photographing devices to be easily set to an optimum arrangement for generation of three-dimensional data.

Solution to Problem

An information processing apparatus according to an aspect of the present disclosure is an information processing apparatus including an evaluation section configured to calculate an evaluation value of an arrangement for generation of three-dimensional data on the basis of the arrangements of a plurality of photographing devices that photograph two-dimensional image data used to generate the three-dimensional data of a photographic object.

An information processing method according to the first aspect of the present disclosure corresponds to the information processing apparatus according to the first aspect of the present disclosure.

According to the first aspect of the present disclosure, an evaluation value of an arrangement for generation of three-dimensional data is calculated on the basis of the arrangements of a plurality of photographing devices that photograph two-dimensional image data used to generate the three-dimensional data of a photographic object.

Note that the information processing apparatus according to the first aspect of the present disclosure can be implemented by a computer when it executes programs.

Further, in order to implement the information processing apparatus according to the first aspect of the present disclosure, the program to be executed by the computer can be provided by being transmitted through a transmission medium or recorded on a recording medium.

Advantageous Effect of Invention

According to the first aspect of the present disclosure, arrangements of a plurality of photographing devices can easily be set to an optimum arrangement for generation of three-dimensional data.

In addition, the advantages described above are not necessarily restrictive in nature, but any of the advantages described in the present disclosure are applicable.

BRIEF DESCRIPTION OF DRAWINGS

FIG. 8 is a block diagram illustrating a configuration example of an evaluation section illustrated in FIG. 5.

FIGS. 10A and 10B are diagrams describing an evaluation value calculated by the evaluation section illustrated in FIG. 8.

FIG. 24 is a diagram illustrating an example of another setting method of the viewing area.

FIG. 25 is a block diagram illustrating a configuration example of hardware of a computer.

DESCRIPTION OF EMBODIMENTS

Hereinafter, modes (hereinafter referred to as embodiments) for carrying out the present disclosure will be described below. Incidentally, the description will be given in the following order.
1. First embodiment: Information processing system (FIGS. 1, 2, 3, 4, 5, 6, 7, 8, 9A, 9B, 9C, 10A, 10B, 11, 12, 13A, 13B, 14, 15, and 16)
2. Second embodiment: Information processing system (FIGS. 17 to 19)
3. Third embodiment: Information processing system (FIGS. 20 to 23)
4. Another method of viewing area (FIG. 24)
5. Fourth embodiment: Computer (FIG. 25)

First Embodiment (Configuration Example of First Embodiment of Information Processing System)

Figure 1:
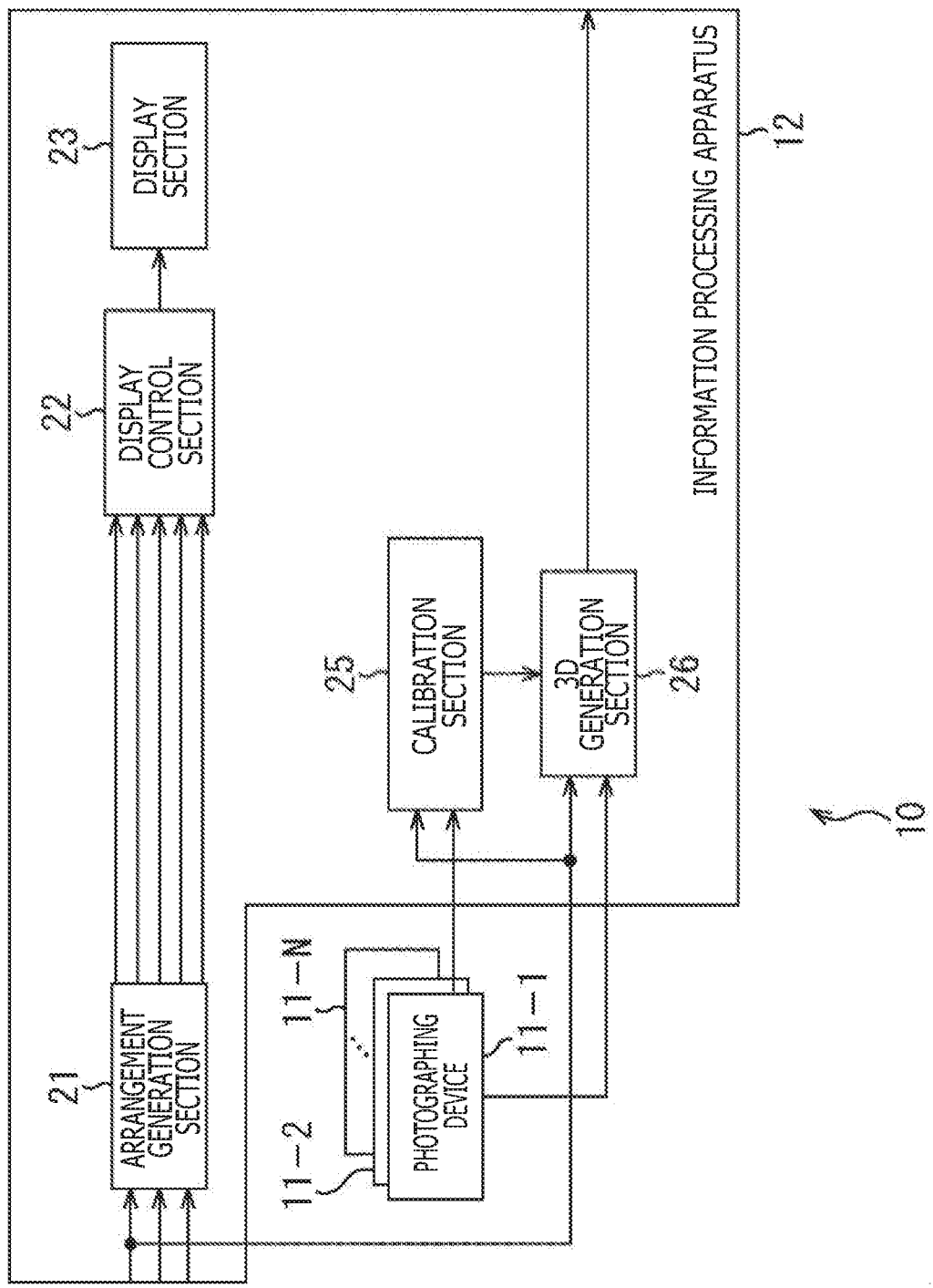
FIG. 1 is a block diagram illustrating a configuration example of a first embodiment of an information processing system to which the present disclosure has been applied.

FIG. 1 is a block diagram illustrating a configuration example of a first embodiment of an information processing system to which the present disclosure has been applied.

The information processing system 10 illustrated in FIG. 1 includes photographing devices 11-1 to 11-N (N is an integer that is equal to or larger than two) and an information processing apparatus 12. Note that, hereinafter, in the case where the photographing devices 11-1 to 11-N need not be discriminated particularly, they will be collectively referred to as the photographing devices 11.

For example, before a photographer installs the photographing devices 11, the information processing system 10 displays an arrangement screen indicating an optimum arrangement of the photographing devices 11. While viewing the arrangement screen, the photographer installs the photographing devices 11 and allows the photographing devices 11 to perform photographing to thereby allow the photographing devices 11 to generate three-dimensional data.

Specifically, each photographing device 11 of the information processing system 10 is installed at the optimum arrangement indicated by the arrangement screen by the photographer who views the arrangement screen displayed on the information processing apparatus 12. The photographing devices 11 perform photographing for calibration and supply two-dimensional image data and depth image data obtained in the result to the information processing apparatus 12. In addition, the photographing devices 11 perform photographing for generating the three-dimensional data and supply the two-dimensional image data and depth image data obtained in the result to the information processing apparatus 12.

The information processing apparatus 12 includes an arrangement generation section 21, a display control section 22, a display section 23, a calibration section 25, and a 3D generation section 26.

To the arrangement generation section 21 of the information processing apparatus 12, an internal parameter including a focal length, an image center, an aspect ratio, a skew, and the like of each photographing device 11 is input. In addition, to the arrangement generation section 21, a minimum value and maximum value of x, y, and z coordinates of a viewing area or information for specifying polygons constituting the viewing area are input as viewing area information indicating a position of the viewing area that is an area of a square pole including a photographic object corresponding to the generated three-dimensional data. Further, to the arrangement generation section 21, the minimum value and maximum value of x, y, and z coordinates of an installation area or information for specifying the polygons constituting the installation area are input as the installation area information indicating a position of the installation area that is an area in which all the photographing devices 11 are installed.

The arrangement generation section 21 calculates evaluation values of arrangements of the photographing devices 11 as a candidate, which corresponds to the generation of the three-dimensional data, on the basis of the internal parameter, the viewing area information, and the installation area information. The arrangement generation section 21 selects an arrangement having a highest evaluation as the optimum arrangement on the basis of the evaluation values of the arrangements of the photographing devices 11 as a candidate. The arrangement generation section 21 generates an external parameter indicating a position t and attitude R of each photographing device 11 at the optimum arrangement as arrangement information. The arrangement generation section 21 supplies the internal parameter, the arrangement information, the viewing area information, the installation area information, and the evaluation value at the optimum arrangement to the display control section 22.

Meanwhile, the arrangement generation section 21 may calculate in sequence the evaluation value of the arrangement as a candidate and finish calculating the evaluation value at the time in the case where the evaluation value is a predetermined threshold or more. Then, the arrangement generation section 21 may set an arrangement corresponding to the evaluation value to the optimum arrangement.

The display control section 22 generates the arrangement screen on the basis of the internal parameter, arrangement information, viewing area information, installation area information, and evaluation value of the optimum arrangement of each photographing device 11 supplied from the arrangement generation section 21. The display control section 22 supplies the arrangement screen to the display section 23. The display section 23 displays the arrangement screen supplied from the display control section 22.

To the calibration section 25, the internal parameter of each photographing device 11 is input. On the basis of the two-dimensional image data, depth image data, and internal parameter supplied from each photographing device 11, the calibration section 25 (arrangement calculation section) performs calibration and calculates the external parameter of each photographing device 11. The calibration section 25 supplies the calculated external parameter of each photographing device 11 to the 3D generation section 26.

To the 3D generation section 26, the internal parameter of each photographing device 11 is input. The 3D generation section 26 generates the three-dimensional data on the basis of the two-dimensional image data and depth image data supplied from each photographing device 11, the external parameter of each photographing device 11 supplied from the calibration section 25, and the internal parameter of each photographing device 11. The 3D generation section 26 outputs the generated three-dimensional data.

Meanwhile, in an example illustrated in FIG. 1, a group of the arrangement generation section 21, the display control section 22, and the display section 23 and also another group of the calibration section 25 and the 3D generation section 26 constitute the same information processing apparatus 12; however, may constitute different information processing apparatuses.

(First Example of Installation Area and Viewing Area)

Figure 2:
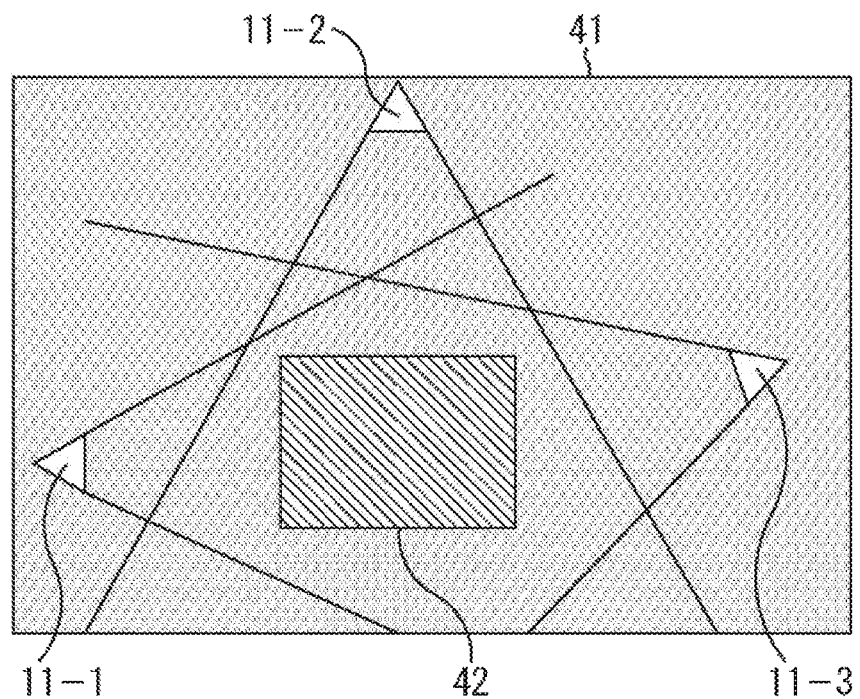
FIG. 2 is a diagram illustrating a first example of an installation area and a viewing area.

FIG. 2 is a diagram illustrating a first example of the installation area and the viewing area.

In an example illustrated in FIG. 2, the number N of the photographing devices 11 is three. The above is similar to even FIGS. 3, 6, 7, 9A, 9B, 9C, 10A, and 10B to be hereinafter described. Further, FIG. 2 is a diagram obtained by viewing the arrangements of the photographing devices 11 from the above of the photographing devices 11. The above is similar to even FIGS. 3, 4, 6, 7, 10A, 10B, 12, 13A, 13B, 22, and 24 to be hereinafter described.

As illustrated in FIG. 2, an installation area 41 can be set so as to include a viewing area 42. In this case, the photographing devices 11 are arranged around the viewing area 42 and perform photographing to the inside of the installation area 41.

Figure 3:
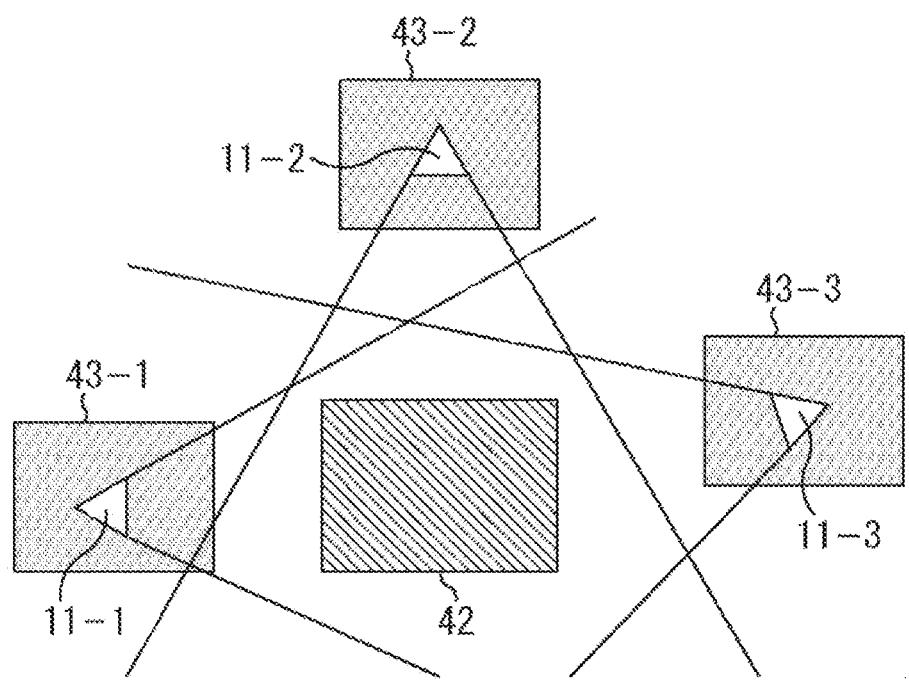
FIG. 3 is a diagram illustrating another example of the installation area illustrated in FIG. 2.

In addition, as illustrated in FIG. 3, the installation areas 43-1 to 43-3 may be set in each photographing device 11. Hereinafter, arrangements of the photographing devices 11 that are arranged so that the installation areas include the viewing area and each photographing device 11 surrounds the viewing area are referred to as a surrounding arrangement.

(Second Example of Installation Area and Viewing Area)

Figure 4:
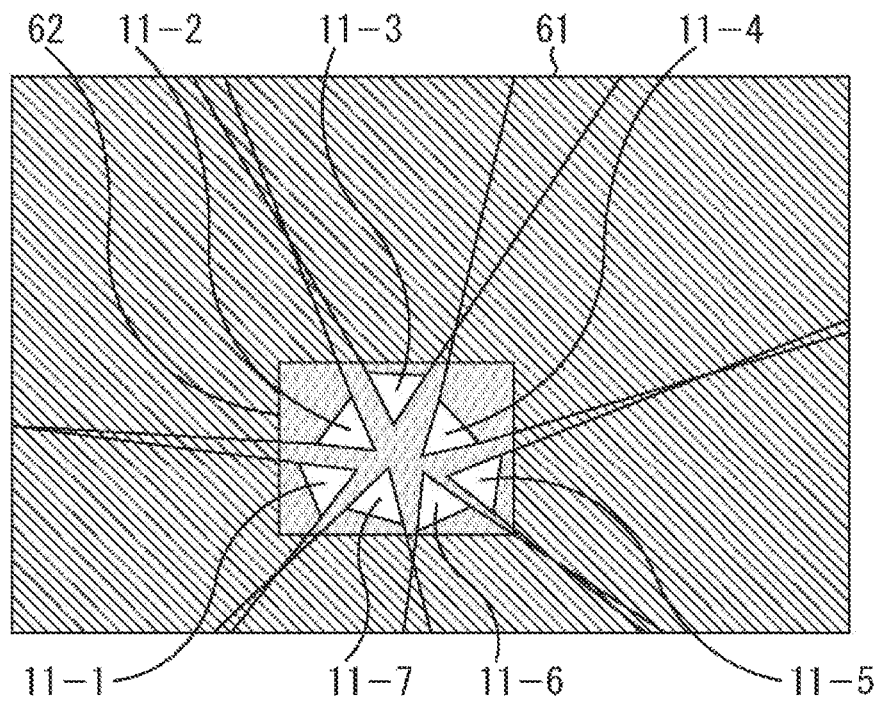
FIG. 4 is a diagram illustrating a second example of the installation area and the viewing area.

FIG. 4 is a diagram illustrating a second example of the installation area and the viewing area.

In an example illustrated in FIG. 4, the number N of the photographing devices 11 is seven.

As illustrated in FIG. 4, the viewing area 61 can be set so as to include the installation area 62. In this case, the photographing devices 11 are arranged inside the viewing area 61 and perform photographing to the outside of the installation area 41. Note that, hereinafter, the viewing area includes the installation area and arrangements of the photographing devices 11 that are arranged so that each photographing device 11 is arranged inside the viewing area are referred to as a looking-around arrangement.

(Configuration Example of Arrangement Generation Section)

Figure 5:
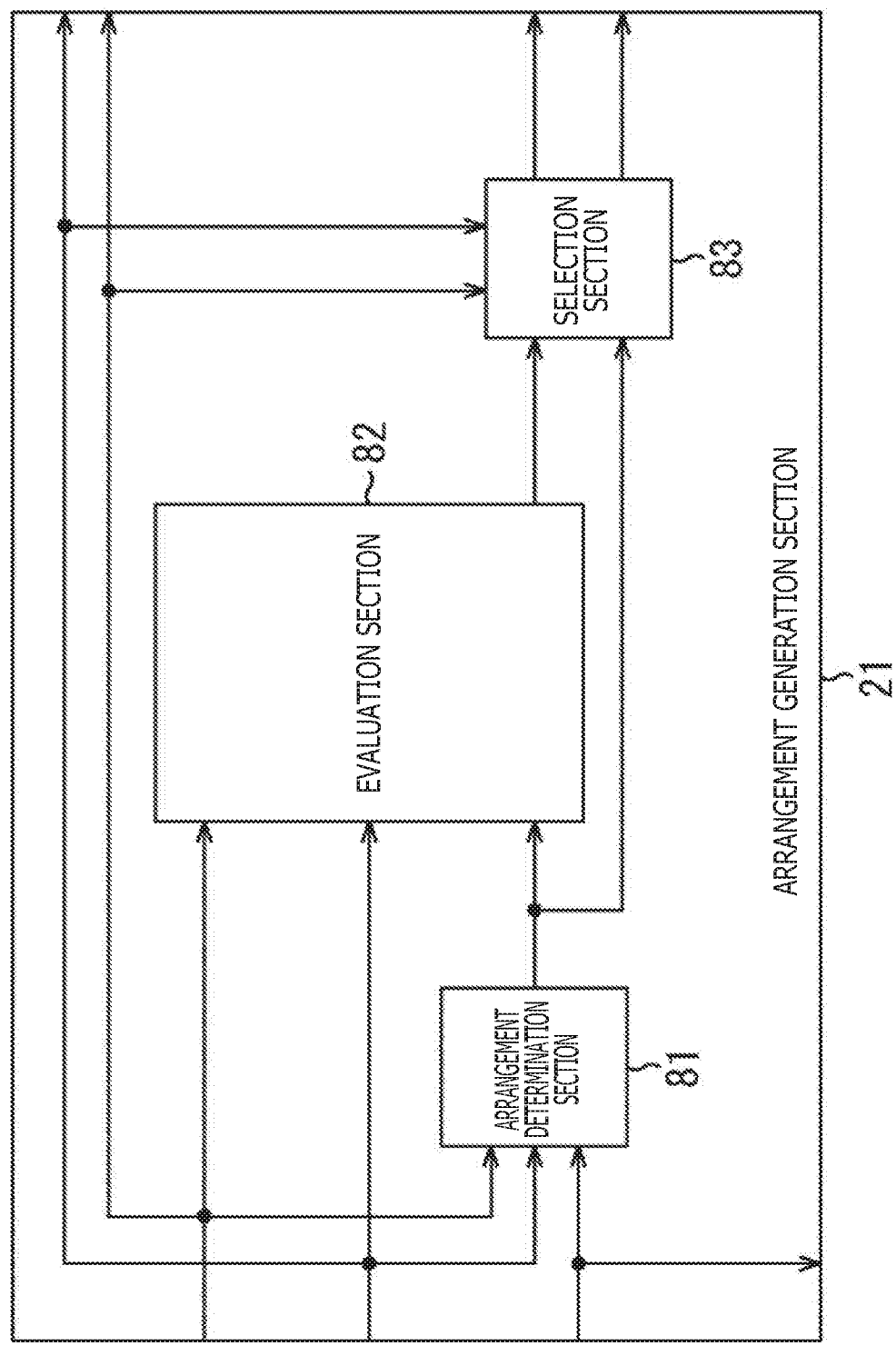
FIG. 5 is a block diagram illustrating a configuration example of an arrangement generation section illustrated in FIG. 1.

FIG. 5 is a block diagram illustrating a configuration example of the arrangement generation section 21 illustrated in FIG. 1.

The arrangement generation section 21 illustrated in FIG. 5 includes an arrangement determination section 81, an evaluation section 82, and a selection section 83. The internal parameter and viewing area information input to the arrangement generation section 21 are supplied to the arrangement determination section 81, the evaluation section 82, and the selection section 83. In addition, the installation area information input to the arrangement generation section 21 is supplied to the arrangement determination section 81. Further, the installation area information, the viewing area information, and the internal parameter are supplied to the display control section 22 illustrated in FIG. 1.

In each arrangement of the photographing devices 11 as a candidate, the arrangement determination section 81 of the arrangement generation section 21 determines the external parameter of each photographing device 11 in the arrangement on the basis of the internal parameter, the viewing area information, and the installation area information. The arrangement determination section 81 supplies the external parameter of each photographing device 11 to the evaluation section 82 and the selection section 83 in each arrangement of the photographing devices 11 as a candidate.

The evaluation section 82 calculates a field angle of each photographing device 11 in each arrangement of the photographing devices 11 as a candidate on the basis of the external parameter and internal parameter of each photographing device 11. The evaluation section 82 calculates the evaluation values of the arrangements of the photographing devices 11 corresponding to the generation of the three-dimensional data in each arrangement of the photographing devices 11 as a candidate on the basis of the field angle of each photographing device 11. The evaluation section 82 supplies the evaluation value to the selection section 83 in each arrangement of the photographing devices 11 as a candidate.

The selection section 83 selects an arrangement having the highest evaluation as the optimum arrangement on the basis of the evaluation value in each arrangement of the photographing devices 11 as a candidate supplied from the evaluation section 82. In addition, the selection section 83 selects the external parameter of each photographing device 11 corresponding to the optimum arrangement from among the external parameters supplied from the arrangement determination section 81. The selection section 83 supplies the arrangement information and evaluation value indicating the external parameter of each selected photographing device 11 to the display control section 22 illustrated in FIG. 1.

(Example of Surrounding Arrangement as Candidate)

Figure 6:
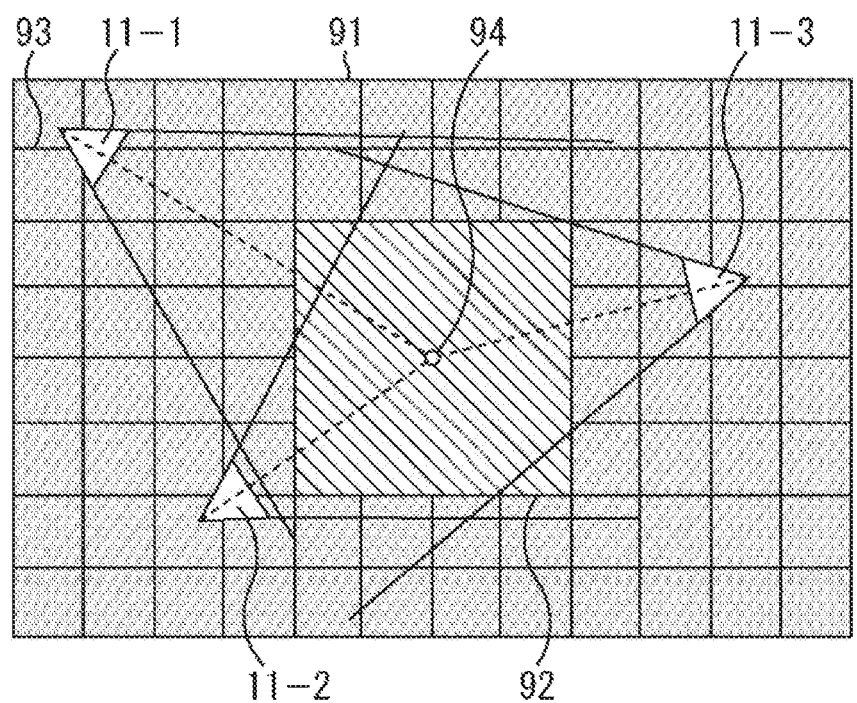
FIG. 6 is a diagram illustrating an example of a surrounding arrangement as a candidate.

FIG. 6 is a diagram illustrating an example of the surrounding arrangement as a candidate.

As illustrated in FIG. 6, in the case where the installation area 91 includes the viewing area 92, the arrangement determination section 81 sets arrangements of the photographing devices 11 as a candidate to the surrounding arrangement. Specifically, the arrangement determination section 81 divides the installation area 91 into a plurality of (in an example illustrated in FIG. 6, 12 (transverse)×8 (longitudinal)) grids 93. Then, the arrangement determination section 81 generates the external parameter of each photographing device 11 including three vertexes as the position t of each photographing device 11 and including an attitude R in which an optical axis of each photographing device 11 passes through a central point 94 of the viewing area 92 in each combination of three vertexes among the vertexes of all the grids 93. The arrangement determination section 81 determines the external parameter of each photographing device 11 for each combination of three vertexes to be the external parameters of the arrangements of the photographing devices 11 as a candidate.

Note that the arrangements of the photographing devices 11 as a candidate may be only an arrangement in which field angles of all the photographing devices 11 include the viewing area 92.

(Example of Looking-Around Arrangement as Candidate)

Figure 7:
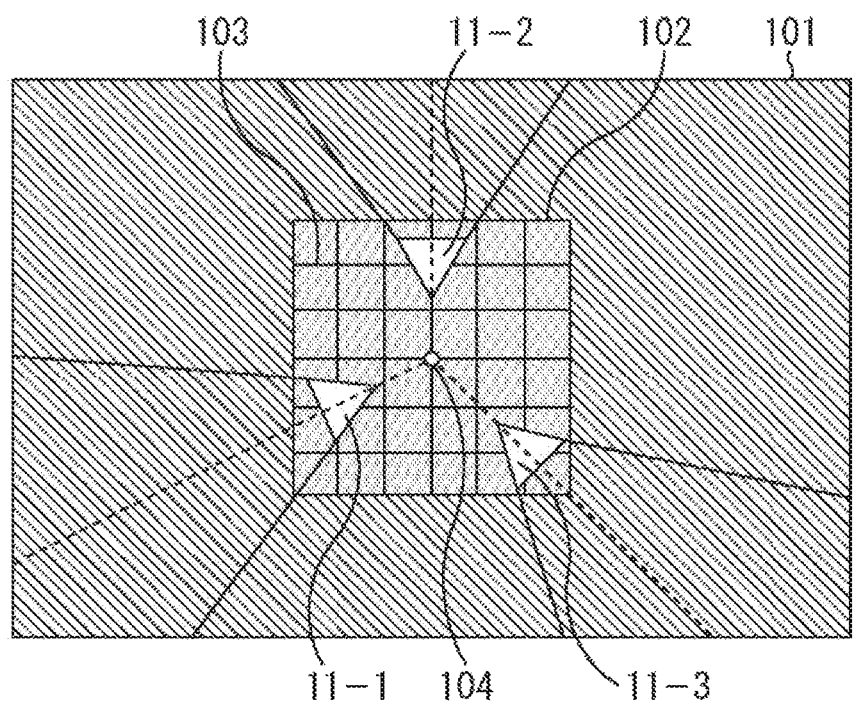
FIG. 7 is a diagram illustrating an example of a looking-around arrangement as a candidate.

FIG. 7 is a diagram illustrating an example of the looking-around arrangement as a candidate.

As illustrated in FIG. 7, in the case where the viewing area 101 includes the installation area 102, the arrangement determination section 81 sets arrangements of the photographing devices 11 as a candidate to the looking-around arrangement. Specifically, the arrangement determination section 81 divides the installation area 102 into a plurality of (in an example illustrated in FIG. 7, 6 (transverse)×6 (longitudinal)) grids 103. Then, the arrangement determination section 81 determines the external parameter of each photographing device 11 including three vertexes as the position t of each photographing device 11 and including an attitude R in which an optical axis of each photographing device 11 passes through a central point 104 of the installation area 102 to be the external parameters of the arrangements of the photographing devices 11 as candidate in each combination of three vertexes among the vertexes of all the grids 103.

(First Configuration Example of Evaluation Section)

FIG. 8 is a block diagram illustrating a configuration example of the evaluation section 82 illustrated in FIG. 5 in a case in which arrangements of the photographing devices 11 as a candidate are the surrounding arrangement.

The evaluation section 82 illustrated in FIG. 8 includes a division section 121, a projection section 122, a determination section 123, and a computation section 124.

The division section 121 of the evaluation section 82 divides a surface of the viewing area in which the input viewing area information indicates a position into a plurality of grids. The division section 121 supplies grid information including the three-dimensional coordinates etc. indicating an upper-left position of each grid to the projection section 122.

Figures 9A, 9B, 9C:
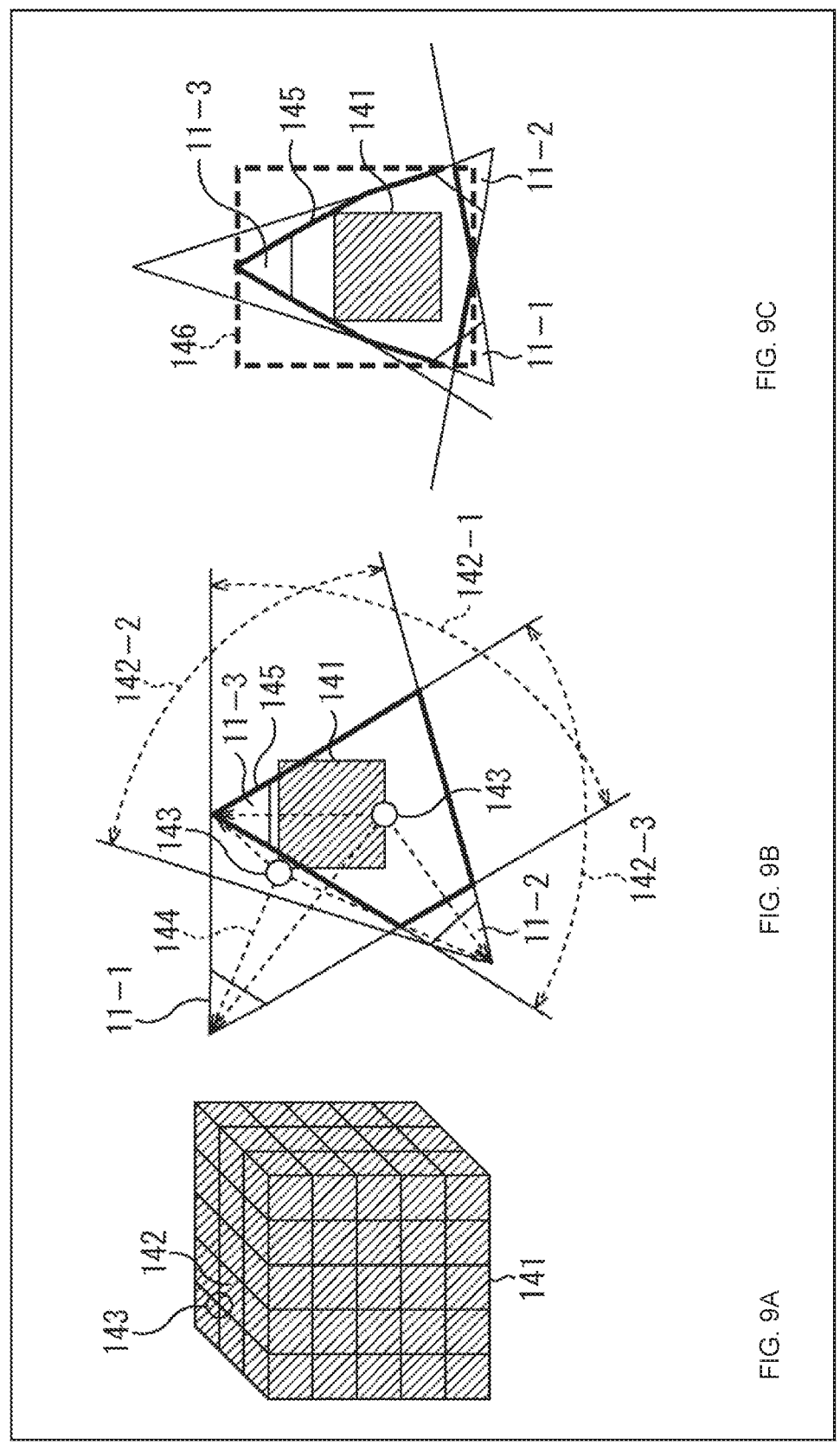
FIGS. 9A, 9B, and 9C are diagrams describing processing by the evaluation section illustrated in FIG. 8.

For example, the division section 121 divides a surface of the viewing area 141 illustrated in FIG. 9A into a plurality of grids 142 and supplies, as the grid information, the three-dimensional coordinates indicating an upper-left position 143 of the grid 142 to the projection section 122. Note that FIG. 9A is a perspective diagram of the viewing area 141.

The projection section 122 projects each grid on each photographing device 11 and generates projection line information indicating a projection line in each arrangement of the photographing devices 11 as a candidate on the basis of the grid information supplied from the division section 121, and also, the external parameter and internal parameter of each photographing device 11. The projection section 122 supplies the projection line information for each photographing device 11 of each grid to the determination section 123 in each arrangement of the photographing devices 11 as a candidate.

For example, the projection section 122 projects the upper-left position 143 of the grid 142 illustrated in FIG. 9B on the respective photographing devices 11-1 to 11-3, and supplies projection line information indicating a projection line 144 to the determination section 123. Note that FIG. 9B is a diagram obtained by viewing the photographing devices 11 and the viewing area 141 from the above of the photographing devices 11. The above is similar to even FIG. 9C.

The determination section 123 detects the number of view counts of the photographing devices 11 in which the projection lines to the photographing devices 11 are present within the field angles of the photographing devices 11 to each grid in each arrangement of the photographing devices 11 as a candidate on the basis of the projection line information supplied from the projection section 122.

In the case where the number of the view counts is the number N of the photographing devices 11, that is, in the case where all the projection lines to each photographing device 11 are present within the field angles of the photographing devices 11, the determination section 123 sets a valid flag indicating whether or not the arrangements of the photographing devices 11 are valid to one indicating that the arrangements are valid, in each grid.

On the other hand, in the case where the number of the view counts is smaller than the number N of the photographing devices 11, that is, in the case where at least one of the projection lines to each photographing device 11 is not present within the field angles of the photographing devices 11, the determination section 123 sets the valid flag to one indicating that the arrangements are not valid, in each grid. The determination section 123 supplies the valid flag of each grid to the calculation section 125 in each arrangement of the photographing devices 11 as a candidate.

For example, the projection lines from the upper-left position 143 to the photographing devices 11-1 and 11-2 as illustrated in FIG. 9B are present within the field angle 142-1 of the photographing device 11-1 and the field angle 142-2 of the photographing device 11-2, respectively. However, the projection line from the upper-left position 143 to the photographing device 11-3 is not present within the field angle 142-3 of the photographing device 11-3. Accordingly, in the grid 142 of the upper-left position 143, the determination section 123 determines the number of the view counts of the photographing devices 11 to be two. Then, two that is the determined number of the view counts is smaller than three that is the number N of the photographing devices 11 and therefore the determination section 123 sets the valid flag of the grid 142 in the upper-left position 143 to zero and supplies zero to the calculation section 125.

On the other hand, the projection lines from the center-lower-part position 143 to the photographing devices 11-1 to 11-3 illustrated in FIG. 9B are present within the field angles 142-1 to 142-3 of the photographing devices 11-1 to 11-3, respectively. Accordingly, the determination section 123 determines the number of the view counts of the photographing devices 11 to be three in the grid 142 of the center-lower-part position 143. Then, three that is the determined number of the view counts is the same as three that is the number N of the photographing devices 11, and therefore the determination section 123 sets the valid flag of the grid 142 in the center-lower-part position 143 to one and supplies one to the calculation section 125.

The computation section 124 generates a convex hull in each arrangement of the photographing devices 11 as a candidate on the basis of the external parameter and internal parameter of each photographing device 11. The convex hull is an area to be intersected at the time when the field angle of each photographing device 11 is projected on the three-dimensional coordinates and is a visual hull generated by the field angles of the photographing devices 11. Details of the convex hull are described in, for example, C. BRADFORD BARBER, DAVID P. DOBKIN, HANNU HUHDANPAA, The Quickhull Algorithm for Convex Hulls.

In the example illustrated in FIG. 9B, the computation section 124 generates the convex hull 145. The three-dimensional data of the viewing area 141 protruded from the convex hull 145 cannot be generated by using the two-dimensional image data and depth image data photographed by the photographing devices 11.

In addition, the computation section 124 computes three-dimensional coordinates of a bounding box that is a square pole circumscribed with the convex hull in each arrangement of the photographing devices 11 as a candidate on the basis of the minimum value and maximum value of x, y, and z coordinates of the convex hull. The computation section 124 supplies the three-dimensional coordinates of the bounding box to the calculation section 125 in each arrangement of the photographing devices 11 as a candidate.

For example, the computation section 124 computes the three-dimensional coordinates of the bounding box 146 that is the square pole circumscribed with the convex hull 145 on the basis of the minimum value and maximum value of the x, y, and z coordinates of the convex hull 145 illustrated in FIGS. 9A, 9B, and 9C and supplies the three-dimensional coordinates to the calculation section 125.

The calculation section 125 determines whether or not the valid flags of all the grids are one in each arrangement of the photographing devices 11 as a candidate on the basis of the valid flag of each grid supplied from the determination section 123. If it is determined that the valid flags of all the grids are one, the calculation section 125 calculates an evaluation value E on the basis of the following formula (1).

[Math. 1]

$$E = \text{len}(\text{BoundingBox}) / \text{len}(\text{viewing area}) \quad (1)$$

Note that a len (R) is a sum of lengths in x, y, and z directions of sides of an area R. In addition, in this specification, a shape of the viewing area is a square pole; however, may be an area having a shape other than a square pole. In this case, in formula (1), an area of a square pole circumscribed with the viewing area is used in place of the viewing area.

According to formula (1), as a proportion of the viewing area occupied in the bounding box is larger, the evaluation value E gets nearer to one. That is, as the proportion of the viewing area occupied in the convex hull is larger, the evaluation value E gets nearer to one.

For example, as illustrated in an upper stage of FIG. 10B, in a case in which the proportion of the viewing area 141 occupied in the convex hull 152 is relatively large, the evaluation value E is a value nearer to one as compared to a case in which the proportion of the viewing area 141 occupied in a convex hull 151 is relatively small as illustrated in an upper stage of FIG. 10A.

Further, in the case where arrangements of the photographing devices 11 are the surrounding arrangement, the 3D generation section 26 generates three-dimensional data from the two-dimensional image data etc. photographed by the photographing devices 11 by using the visual hull. Accordingly, as illustrated in the upper stage of FIG. 10A, in a case in which the proportion of the viewing area 141 occupied in the convex hull 151 that is the visual hull generated by the field angle is relatively small, the proportion of a two-dimensional image 162 of the viewing area 141 within a two-dimensional image 161 generated by the three-dimensional data is relatively small as illustrated in a lower stage of FIG. 10A.

In contrast, as illustrated in the upper stage of FIG. 10B, in a case in which the proportion of the viewing area 141 occupied in the convex hull 152 is relatively large, the proportion of a two-dimensional image 164 of the viewing area 141 within a two-dimensional image 163 generated by the three-dimensional data is relatively large as illustrated in a lower stage of FIG. 10B. Accordingly, resolution of the two-dimensional image 162 in the viewing area 141 becomes higher than that of the two-dimensional image 164 in the viewing area 141. Therefore, as the evaluation value E calculated by formula (1) gets nearer to one, accuracy of the three-dimensional data becomes higher.

Further, in the case where it is determined that the valid flag of at least one of the grids is one, that is, in the case where at least one portion of the viewing area is not included within the field angle of at least one of the photographing devices 11, the calculation section 125 determines the evaluation value E to be zero. The calculation section 125 supplies the evaluation value E for each arrangement of the photographing devices 11 as a candidate to the selection section 83 illustrated in FIG. 5.

By determining the evaluation value E as described above, the evaluation value E corresponding to the arrangement of the photographing device 11 having highest accuracy of the three-dimensional data gets nearest to one. Accordingly, the selection section 83 selects an arrangement in which the evaluation value E is nearest to one as the optimum arrangement.

Note that, in the example illustrated in FIG. 8, the projection section 122 projects the grids on the photographing devices 11; however, the projection section 122 may project the photographing devices 11 on the grids.

Further, when the evaluation value E is a value indicating accuracy of the visual hull generated by using the two-dimensional image data etc. photographed by the photographing devices 11, the evaluation value E may be other than a value indicating the proportion of the viewing area occupied in the bounding box.

For example, the evaluation value E may be set to a value indicating the proportion of the viewing area occupied in the convex hull, a volume and surface area of the convex hull, a difference between lengths of sides in the x, y, and z directions of the bounding box, or the like. In this case, an arrangement corresponding to the evaluation value E indicating that the proportion of the viewing area occupied in the convex hull is largest, the volume and surface area of the convex hull are smallest, and the difference between lengths of sides in the x, y, and z directions of the bounding box is smallest (the bounding box gets nearest to a cube) is selected as the optimum arrangement.

(Second Configuration Example of Evaluation Section)

Figure 11:
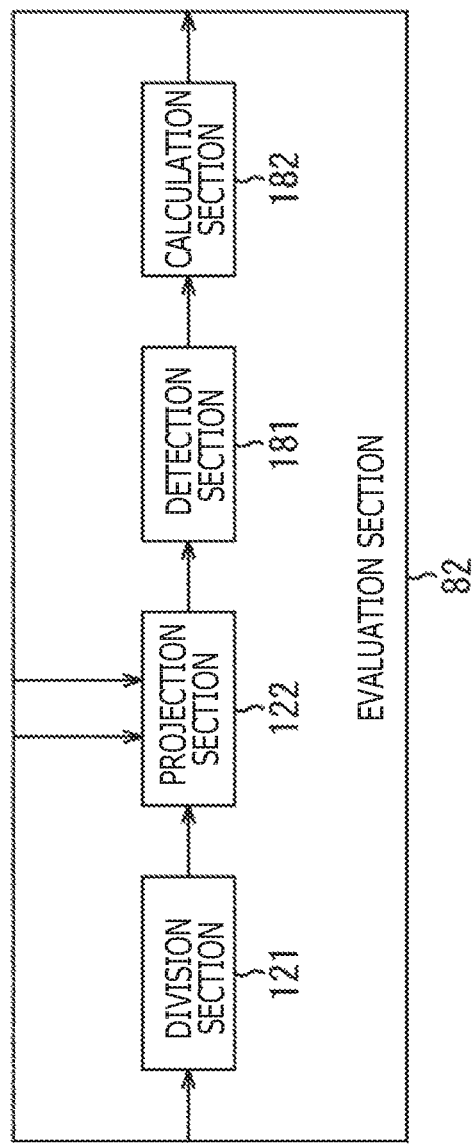
FIG. 11 is a block diagram illustrating another configuration example of the evaluation section illustrated in FIG. 5.

FIG. 11 is a block diagram illustrating a configuration example of the evaluation section 82 illustrated in FIG. 5 in a case in which arrangements of the photographing devices 11 as a candidate are the looking-around arrangement.

In the configuration illustrated in FIG. 11, the same reference sign is assigned to the same configuration as that illustrated in FIG. 8. Overlapping description is appropriately omitted.

The configuration of the evaluation section 82 illustrated in FIG. 11 differs from that illustrated in FIG. 8 in that a detection section 181 and a calculation section 182 are formed in place of the determination section 123 and the calculation section 125 and in that the computation section 124 is not formed.

The detection section 181 of the evaluation section 82 detects the number of the view counts of each grid in each arrangement of the photographing devices 11 as a candidate on the basis of the projection line information supplied from the projection section 122.

Figure 12:
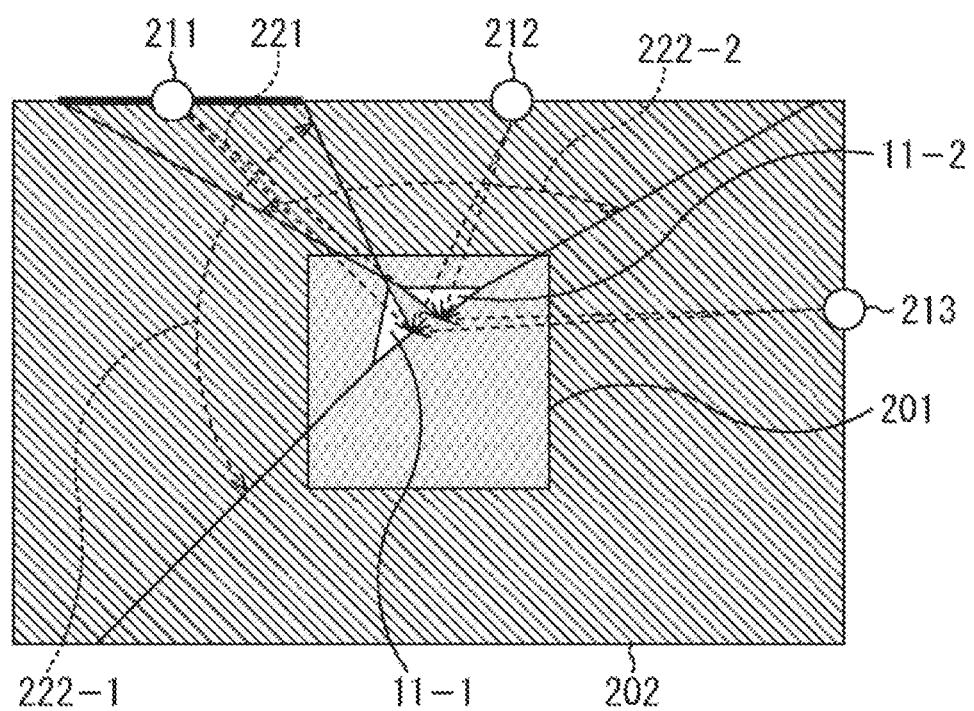
FIG. 12 is a diagram describing the number of view counts.

In an example illustrated in FIG. 12, the number N of the photographing devices 11 is two. Further, in a plurality of grids that divide a surface of the viewing area 202 including the installation area 201, the projection lines 221 from the upper-left position 211 of one grid to the photographing devices 11-1 and 11-2 are present within the field angle 222-1 of the photographing device 11-1 and the field angle 222-2 of the photographing device 11-2, respectively. Accordingly, the number of the view counts of the grid in which the upper-left position is the position 211 is two.

Further, in the example illustrated in FIG. 12, the projection line 221 from the upper-left position 212 of one grid to the photographing device 11-2 is present within the field angle 222-2, but the projection line 221 from the upper-left position 212 to the photographing device 11-1 is not present within the field angle 222-1. Accordingly, the number of the view counts of the grid in which the upper-left position is the position 212 is one.

Further, in the example illustrated in FIG. 12, the projection lines 221 from the upper-left position 211 of one grid to the photographing devices 11-1 and 11-2 are not present within the field angles 222-1 and 222-2, respectively. Accordingly, the number of the view counts of the grid in which the upper-left position is the position 213 is zero. The detection section 181 supplies the number of the view counts of each grid to the calculation section 182.

The calculation section 182 calculates the evaluation value E on the basis of the following formula (2) in each arrangement of the photographing devices 11 as a candidate on the basis of the number of the view counts of each grid supplied from the detection section 181.

[Math. 2]

$$E = \frac{\Sigma_{x,y,x} \text{Value}(x, y, z)}{\text{GridCount}} \quad (2)$$

According to formula (2), the evaluation value E is a value obtained by dividing an integrated value of a value (x, y, z) of all the grids by a grid gount. Note that the grid gount is the number of the grids divided by the division section 121. Further, when the three-dimensional position information associated with the photographic object in the three-dimensional data generated by the 3D generation section 26 is generated by the two-dimensional image data etc. photographed by the photographing devices 11, the value (x, y, z) is calculated by the following formula (3) in each grid.

[Math. 3]

$$\text{Value}(x, y, z) = \begin{cases} 0 (\text{ViewCount}(x, y, z) \leq 1) \\ 1 (\text{otherwise}) \end{cases} \quad (3)$$

According to formula (3), if the grid is redundantly present within the field angles of two or more photographing devices 11, the value (x, y, z) of each grid is one and, if the grid is not redundantly present, is zero.

Figure 13:
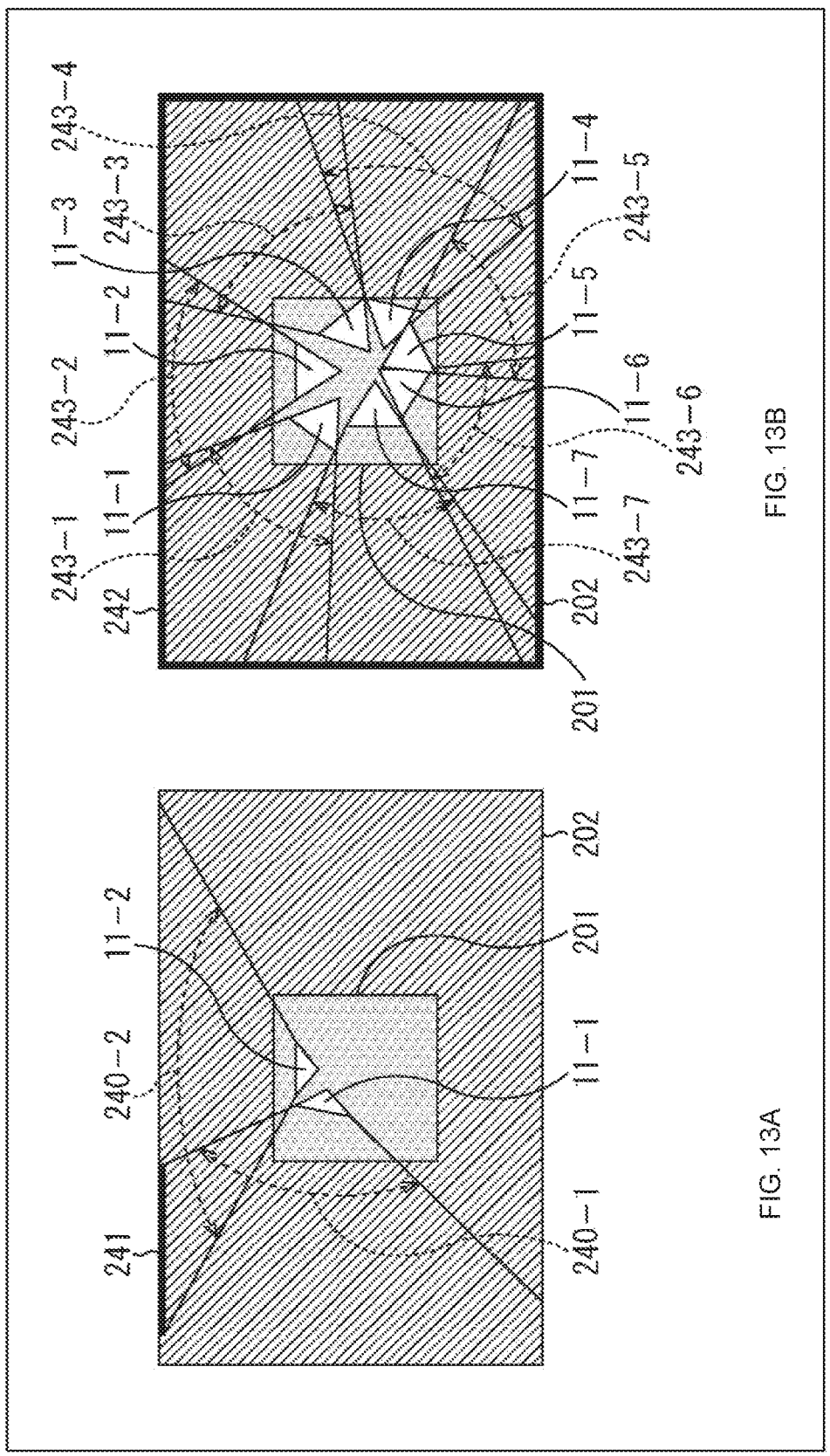
FIGS. 13A and 13B are diagrams describing a value (x, y, z).

As illustrated in FIG. 13A, for example, the number N of the photographing devices 11 is two, and the area 241 in a surface of the viewing area 202 is an area in which the grid is redundantly present within the field angle 240-1 of the photographing device 11-1 and the field angle 240-2 of the photographing device 11-2. Accordingly, a value (x, y, z) of the grid within the area 241 is one and a value (x, y, z) of the grid outside the area 241 is zero. According to the above-described formulas (2) and (3), as an area in which the grid is redundantly present within the field angles of the two or more photographing devices 11 in a surface of the viewing area is larger, the evaluation value E becomes larger.

Further, in order to generate the three-dimensional position information regarding the photographic object from the two-dimensional image data, the photographic object needs to be redundantly present within the field angles of the two or more photographing devices 11. Accordingly, as an area in which the photographic object is present redundantly within the field angles of the two or more photographing devices 11 in a surface of the viewing area is larger, the accuracy of the three-dimensional data is higher. Therefore, as the accuracy of the three-dimensional data is higher, the evaluation value E is larger.

On the other hand, in the case where the three-dimensional position information in the three-dimensional data generated by the 3D generation section 26 is determined in advance, the value (x, y, z) is represented by the following formula (4).

[Math. 4]

$$\text{Value}(x, y, z) = \begin{cases} 0 (\text{ViewCount}(x, y, z) < 1) \\ 1 (\text{otherwise}) \end{cases} \quad (4)$$

According to formula (4), if the grid is present within the field angles of one or more photographing devices 11, the value (x, y, z) of each grid is one and, if the grid is not present within the field angles of any of the photographing devices 11, is zero.

As illustrated in FIG. 13B, for example, the number N of the photographing devices 11 is seven and in the whole area 242 in the surface of the viewing area 202, the grid is present within any of the field angles 243-1 to 243-7 of the photographing devices 11-1 to 11-7. Accordingly, the values (x, y, z) of all the grids are one. According to the above-described formulas (2) and (4), as an area in which the grid is present within the field angles of the one or more photographing devices 11 in the surface of the viewing area is larger, the evaluation value E is larger.

Further, in order to generate the two-dimensional image data of the photographic object having the known three-dimensional position information from the two-dimensional image data, the photographic object needs to be present within the field angles of the one or more photographing devices 11. Accordingly, as an area in which the photographic object is present within the field angles of the one or more photographing devices 11 in the surface of the viewing area is larger, the accuracy of the three-dimensional data is higher. Therefore, as the accuracy of the three-dimensional data is higher, the evaluation value E is larger.

The evaluation value E for each arrangement of the photographing devices 11 as a candidate, which is calculated as described above, is supplied to the selection section 83 illustrated in FIG. 5. As described above, as the accuracy of the three-dimensional data is higher, the evaluation value E is larger. Accordingly, the selection section 83 selects an arrangement in which the evaluation value E is largest, as the optimum arrangement.

(Example of Arrangement Screen)

Figure 14:
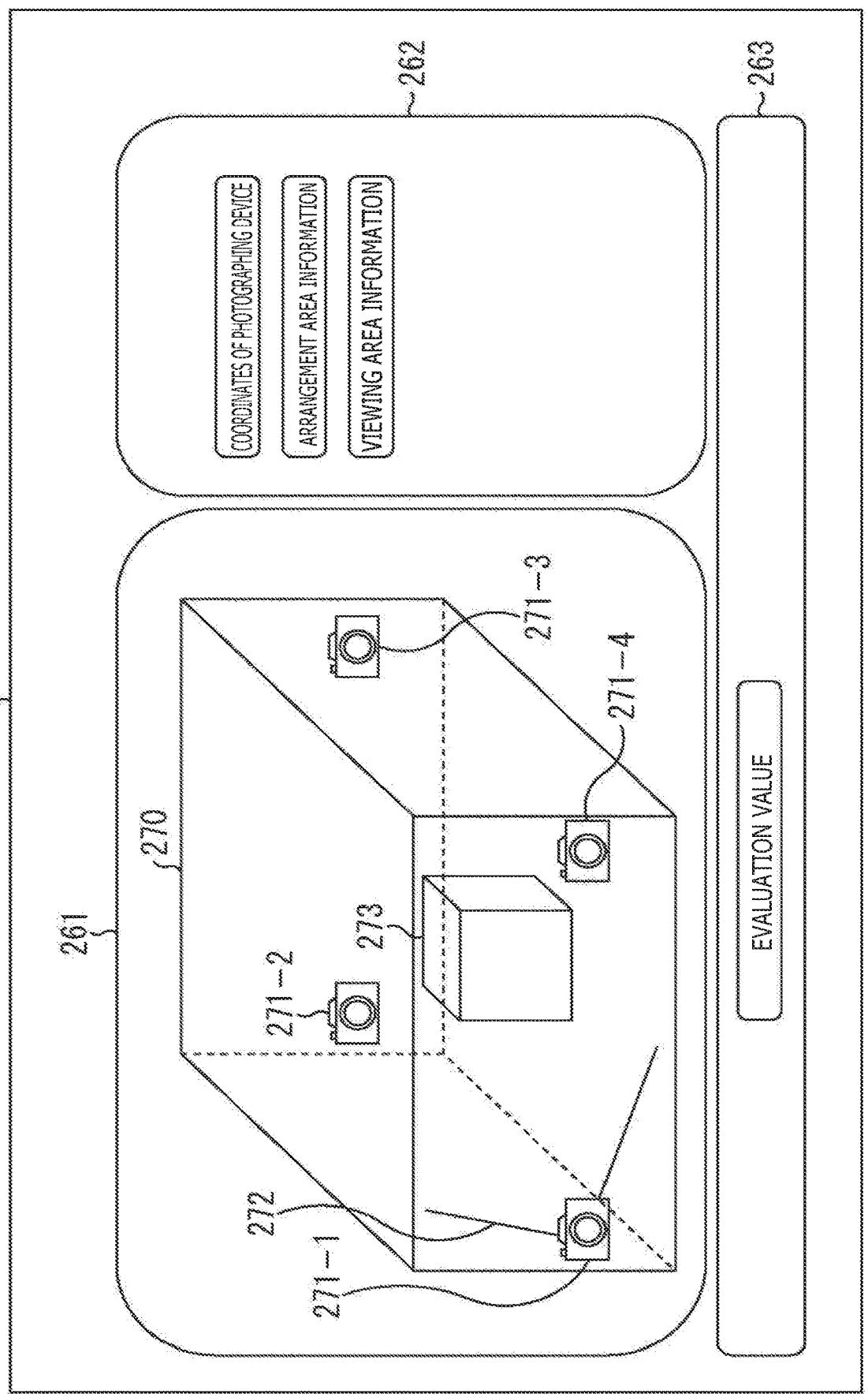
FIG. 14 is a diagram illustrating an example of an arrangement screen.

FIG. 14 is a diagram illustrating an example of the arrangement screen in a case in which arrangements of the photographing devices 11 corresponding to the arrangement information are the surrounding arrangement.

Note that, in an example illustrated in FIG. 14, the number N of the photographing devices 11 is four.

An arrangement screen 260 illustrated in FIG. 14 includes an arrangement display section 261, an arrangement information display section 262, and an evaluation value display section 263.

On the arrangement display section 261, a three-dimensional coordinate space is displayed. In the three-dimensional coordinate space, an installation area image 270 indicating the installation area is displayed in a position of the installation area on the basis of the installation area information. Further, photographing device images 271-1 to 271-4 indicating the photographing devices 11-1 to 11-4 are displayed in positions of the photographing devices 11-1 to 11-4 as information indicating arrangements of the photographing devices 11 on the basis of the arrangement information associated with each photographing device 11. Accordingly, the photographing device images 271-1 to 271-4 are displayed within the installation area image 270. Note that, hereinafter, in the case where the photographing device images 271-1 to 271-4 need not be discriminated particularly, they are collectively referred to as the photographing device images 271.

Further, a field angle image 272 indicating a border of the field angle of each photographing device 11 is connected to the photographing device image 271 and is displayed in the three-dimensional coordinate space on the basis of the arrangement information and internal parameter of each photographing device 11. Meanwhile, for convenience of description, only the field angle image 272 of the photographing device image 271-1 is illustrated in FIG. 14. In addition, the viewing area image 273 indicating the viewing area is displayed in a position of the viewing area in the three-dimensional coordinate space on the basis of the viewing area information.

On the arrangement information display section 262, coordinates of the position t, arrangement area information, and viewing area information included in the arrangement information associated with each photographing device 11 are displayed. On the evaluation value display section 263, the evaluation value is displayed.

Figure 15:
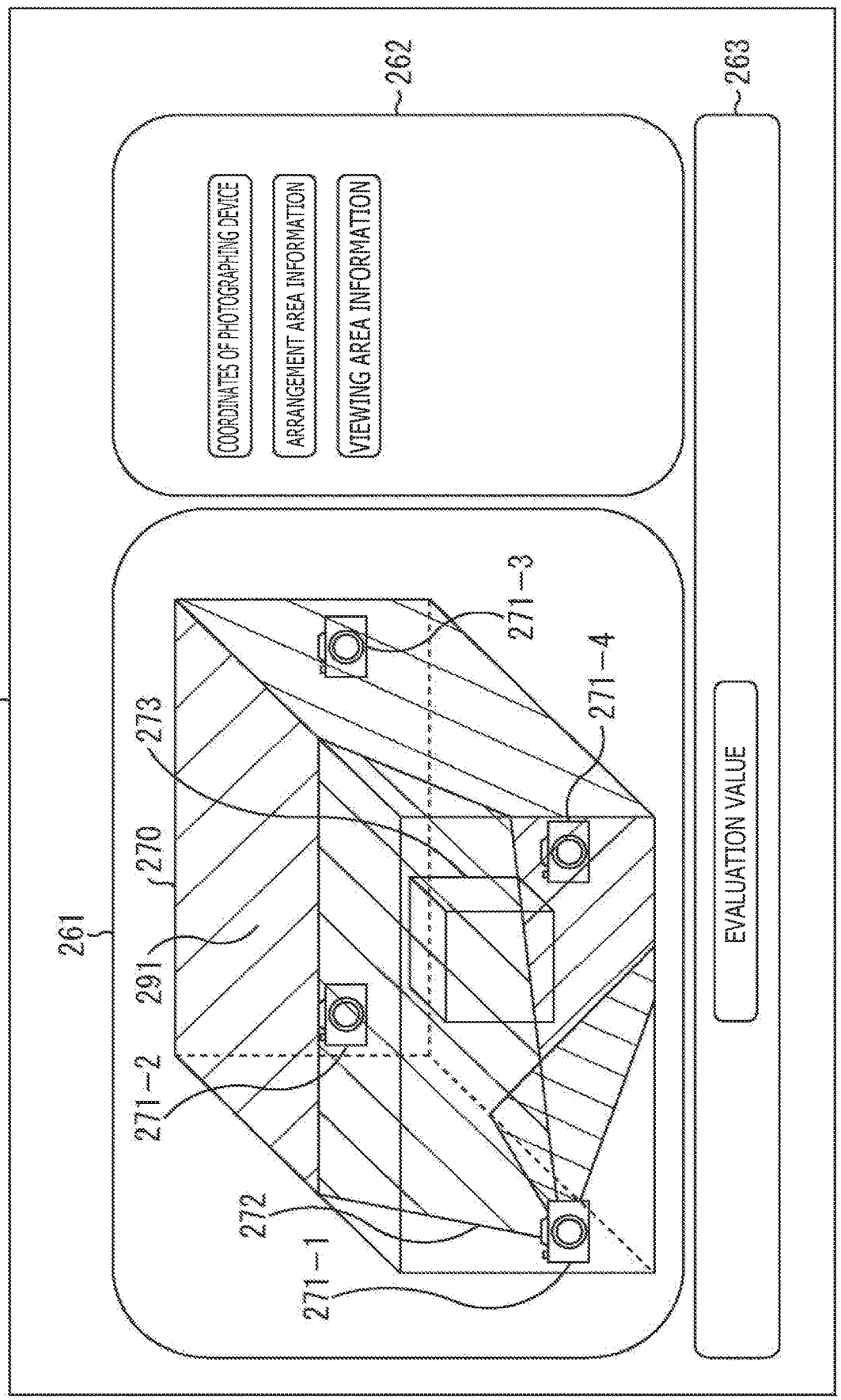
FIG. 15 is a diagram illustrating another example of the arrangement screen.

In the arrangement screen 260, in the case where the photographing device image 271 is selected by the photographer or the like, a range of the field angle in which the field angle image 272 of the selected photographing device image 271 indicates a border is highlighted. For example, in the case where the photographing device image 271-1 is selected, a range 291 of the field angle in which the field angle image 272 of the photographing device image 271-1 indicates a border is highlighted as illustrated in FIG. 15.

Through this process, the photographer can know an optimum photographing range of each photographing device 11 in the arrangements of the photographing devices 11 before the photographing.

Note that the arrangement screen is not limited to the example illustrated in FIG. 14 and further the attitude R, the convex hull, or the like may be displayed on the arrangement screen. Further, a display and non-display of the arrangement display section 261, the arrangement information display section 262, and the evaluation value display section 263 may be selectable by the photographer or the like.

(Descriptions of Processing of Information Processing Apparatus)

Figure 16:
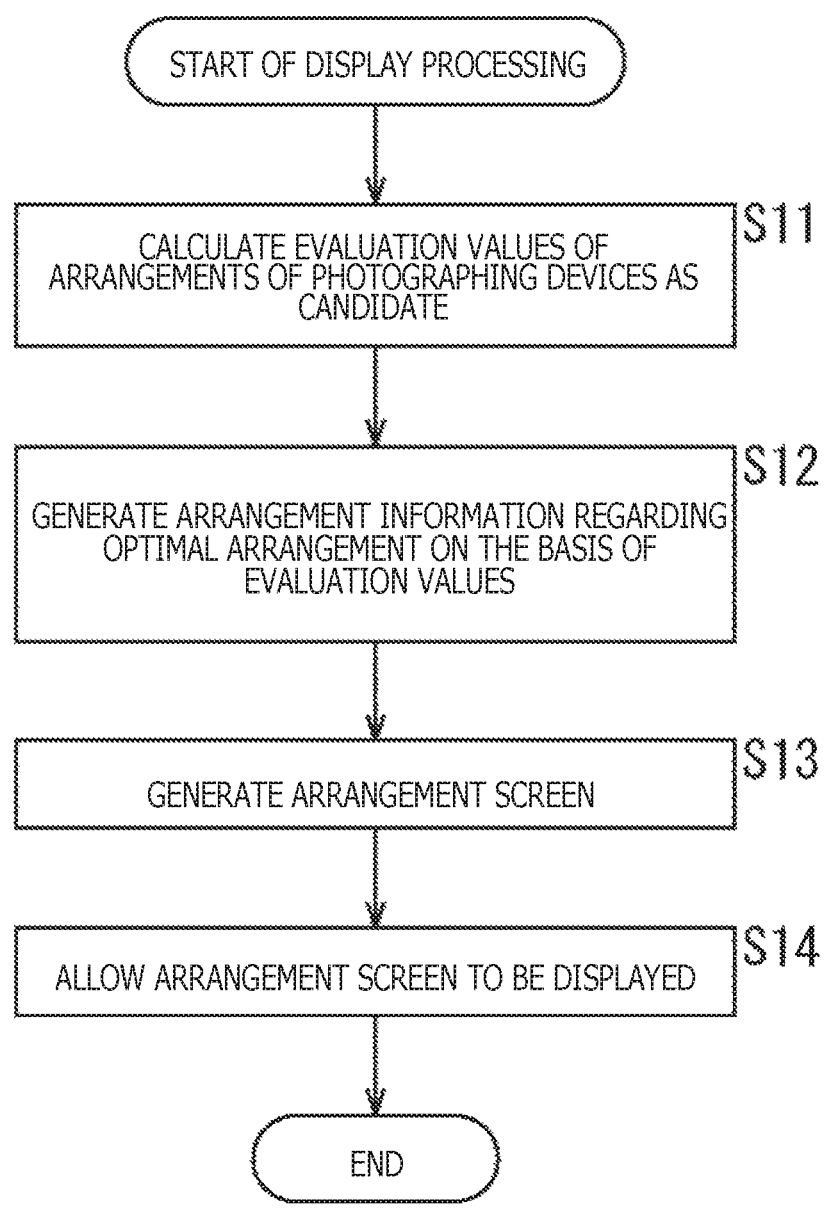
FIG. 16 is a flowchart describing display processing of an information processing apparatus illustrated in FIG. 1.

FIG. 16 is a flowchart describing display processing of the information processing apparatus 12 illustrated in FIG. 1.

In step S11 illustrated in FIG. 16, the arrangement generation section 21 of the information processing apparatus 12 calculates the evaluation values of the arrangements of the photographing devices 11 as a candidate, which corresponds to the generation of the three-dimensional data, on the basis of the internal parameter, the viewing area information, and the installation area information.

In step S12, the arrangement generation section 21 generates the external parameter of each photographing device 11 in the optimum arrangement as the arrangement information on the basis of the evaluation values of the arrangements of the photographing devices 11 as a candidate. The arrangement generation section 21 supplies the internal parameter, the arrangement information, the viewing area information, the installation area information, and the evaluation value of the optimum arrangement to the display control section 22.

In step S13, the display control section 22 generates the arrangement screen on the basis of the internal parameter, arrangement information, viewing area information, installation area information, and evaluation value of the optimum arrangement supplied from the arrangement generation section 21.

In step S14, the display control section 22 supplies the arrangement screen to the display section 23 and allows the display section 23 to display the arrangement screen. Then, the process is ended.

In the information processing apparatus 12, after the above-described display processing is performed, the calibration is performed by the calibration section 25 and the three-dimensional data is generated by the 3D generation section 26.

As described above, the information processing apparatus 12 calculates the evaluation values of the arrangements of the photographing devices 11 as a candidate, which corresponds to the generation of the three-dimensional data, on the basis of the arrangements of the photographing devices 11 as a candidate. Accordingly, for example, the information processing apparatus 12 can select the optimum arrangement of the photographing devices 11 from among the arrangements of the photographing devices 11 as a candidate and display the arrangement screen of the arrangement to the photographer on the basis of the evaluation value. Through this process, the photographer can easily set the arrangements of the photographing devices 11 to the optimum arrangement for the generation of the three-dimensional data. In the result, the accuracy of the three-dimensional data can be improved.

In addition, the photographer need not repeat works such as rearrangement, calibration, photographing, and confirmation of the accuracy of the generated three-dimensional data of the photographing devices 11 until the three-dimensional data having sufficient accuracy is obtained. Accordingly, the photographing time can be shortened.

Second Embodiment (Configuration Example of Second Embodiment of Information Processing System)

Figure 17:
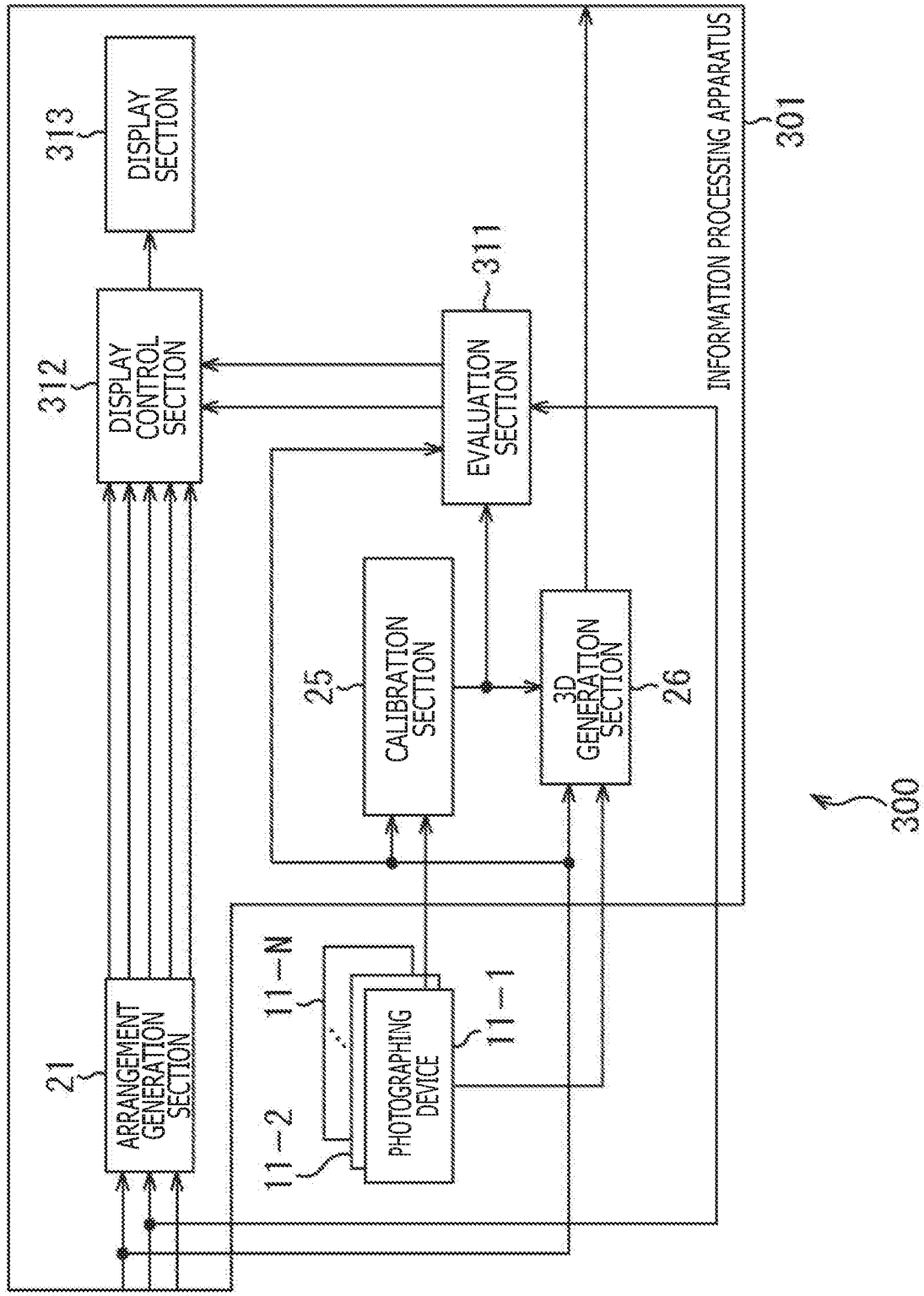
FIG. 17 is a block diagram illustrating a configuration example of a second embodiment of the information processing system to which the present disclosure has been applied.

FIG. 17 is a block diagram illustrating a configuration example of a second embodiment of an information processing system to which the present disclosure has been applied.

In the configuration illustrated in FIG. 17, the same reference sign is assigned to the same configuration as that illustrated in FIG. 1. Overlapping description is appropriately omitted.

The configuration of an information processing system 300 illustrated in FIG. 17 differs from that of the information processing system 10 illustrated in FIG. 1 in that an information processing apparatus 301 is formed in place of the information processing apparatus 12.

After performing the calibration, for example, the information processing system 300 displays an arrangement comparison screen indicating the optimum arrangement and actual arrangements of the photographing devices 11. The photographer corrects a deviation of a position or optical axis of the photographing devices 11 while viewing the arrangement comparison screen and allows the photographing devices 11 to perform photographing to thereby allow the photographing devices 11 to generate three-dimensional data.

The configuration of the information processing apparatus 301 differs from that of the information processing apparatus 12 illustrated in FIG. 1 in that an evaluation section 311 is newly formed and a display control section 312 and a display section 313 are formed in place of the display control section 22 and the display section 23.

To the evaluation section 311 of the information processing apparatus 301, the internal parameter and viewing area information associated with each photographing device 11 are input. In addition, to the evaluation section 311, the external parameter of each photographing device 11 calculated by the calibration section 25 is input. The evaluation section 311 calculates the evaluation value of the actual arrangement of each photographing device 11 similarly to the evaluation section 82 illustrated in FIG. 8 or 11 on the basis of the input internal parameter, external parameter, and viewing area information associated with each photographing device 11.

The evaluation section 311 supplies, as the actual arrangement information, the external parameter of each photographing device 11 calculated by the calibration section 25 to the display control section 312. At the same time, the evaluation section 311 supplies the evaluation value of the actual arrangement of each photographing device 11 to the display control section 312.

The display control section 312 generates the arrangement comparison screen on the basis of the internal parameter, arrangement information, viewing area information, installation area information, and evaluation value of the optimum arrangement of each photographing device 11 supplied from the arrangement generation section 21, and also, the actual arrangement information and evaluation value of the actual arrangement supplied from the evaluation section 311. The display control section 312 supplies the arrangement comparison screen to the display section 313. The display section 313 displays the arrangement comparison screen supplied from the display control section 312.

(Example of Arrangement Comparison Screen)

Figure 18:
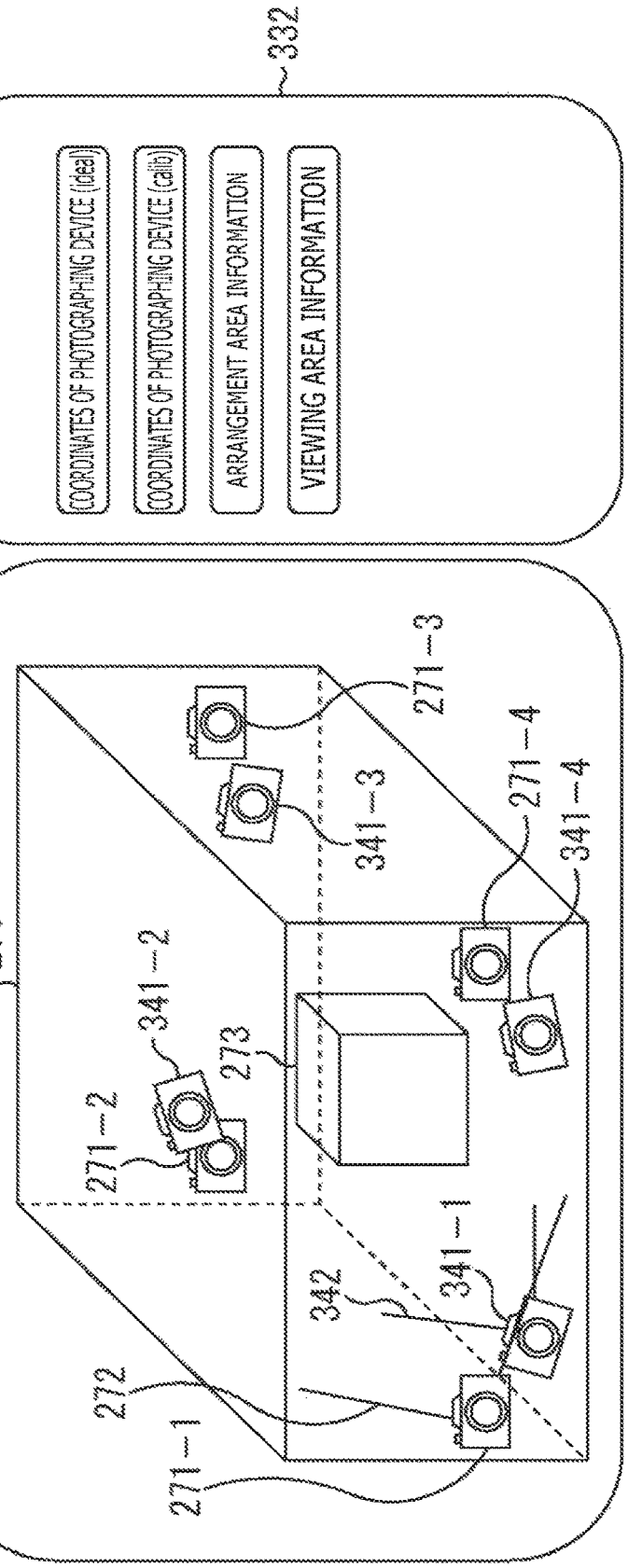
FIG. 18 is a diagram illustrating an example of an arrangement comparison screen.

FIG. 18 is a diagram illustrating an example of the arrangement comparison screen in a case in which the optimum arrangement and actual arrangements of the photographing devices 11 are the surrounding arrangement.

Note that, in the example illustrated in FIG. 18, the number N of the photographing devices 11 is four.

The arrangement comparison screen 330 illustrated in FIG. 18 includes an arrangement display section 331, an arrangement information display section 332, and an evaluation value display section 333.

The arrangement display section 331 is the same as the arrangement display section 261 illustrated in FIG. 14 with the exception that actual photographing device images 341-1 to 341-4 and an actual field angle image 342 are newly displayed. Note that, hereinafter, in the case where the actual photographing device images 341-1 to 341-4 need not be discriminated particularly, they are collectively referred to as the actual photographing device images 341.

On the basis of the actual arrangement information associated with each photographing device 11, the actual photographing device images 341 are images that are displayed in positions of the actual photographing devices 11-1 to 11-4 on the three-dimensional coordinate space displayed on the arrangement display section 331 and are displayed as information indicating the actual arrangements of the photographing devices 11.

Further, the actual field angle image 342 is an image indicating a border of the actual field angle of each photographing device 11, which is displayed on the three-dimensional coordinate space of the arrangement display section 331, on the basis of the actual arrangement information and internal parameter of each photographing device 11. The actual field angle image 342 is connected to the actual photographing device images 341 and is displayed. Note that, in FIG. 18, for convenience of description, only the actual field angle image 342 of the actual photographing device image 341-1 is illustrated.

The arrangement information display section 332 is the same as the arrangement information display section 262 illustrated in FIG. 14 with the exception that the coordinates of the position t included in the actual arrangement information associated with each photographing device 11 are newly displayed. In FIG. 18, the coordinates of the position t included in the actual arrangement information are described as "the coordinates (calib) of the photographing device" and the coordinates of the position t included in the arrangement information output from the arrangement generation section 21 are described as "the coordinates (ideal) of the photographing device."

The evaluation value display section 333 is the same as the evaluation value display section 263 illustrated in FIG. 14 with the exception that the evaluation value of the actual arrangement of each photographing device 11 is newly displayed. In FIG. 18, the evaluation value of the actual arrangement of each photographing device 11 is described as "the evaluation value (calib)" and the evaluation value output from the arrangement generation section 21 is described as "the evaluation value (ideal)."

Note that, although its illustration is omitted, even in the actual photographing device image 341, similarly to the photographing device image 271, in the case where the actual photographing device images 341 are selected by the photographer or the like, a range of the field angle in which the actual field angle image 342 of the selected actual photographing device image 341 indicates a border is highlighted. Through this process, the photographer can know a photographing range of each photographing device 11 in the actual arrangements of the photographing devices 11.

Further, the arrangement comparison screen is not limited to the example illustrated in FIG. 18 and further the attitude R, convex hull, or the like of each photographing device 11 in the actual arrangements of the photographing devices 11 may be displayed on the arrangement comparison screen. Further, a display and non-display of the arrangement display section 331, the arrangement information display section 332, and the evaluation value display section 333 may be selectable by the photographer or the like.

(Descriptions of Processing of Information Processing Apparatus)

Figure 19:
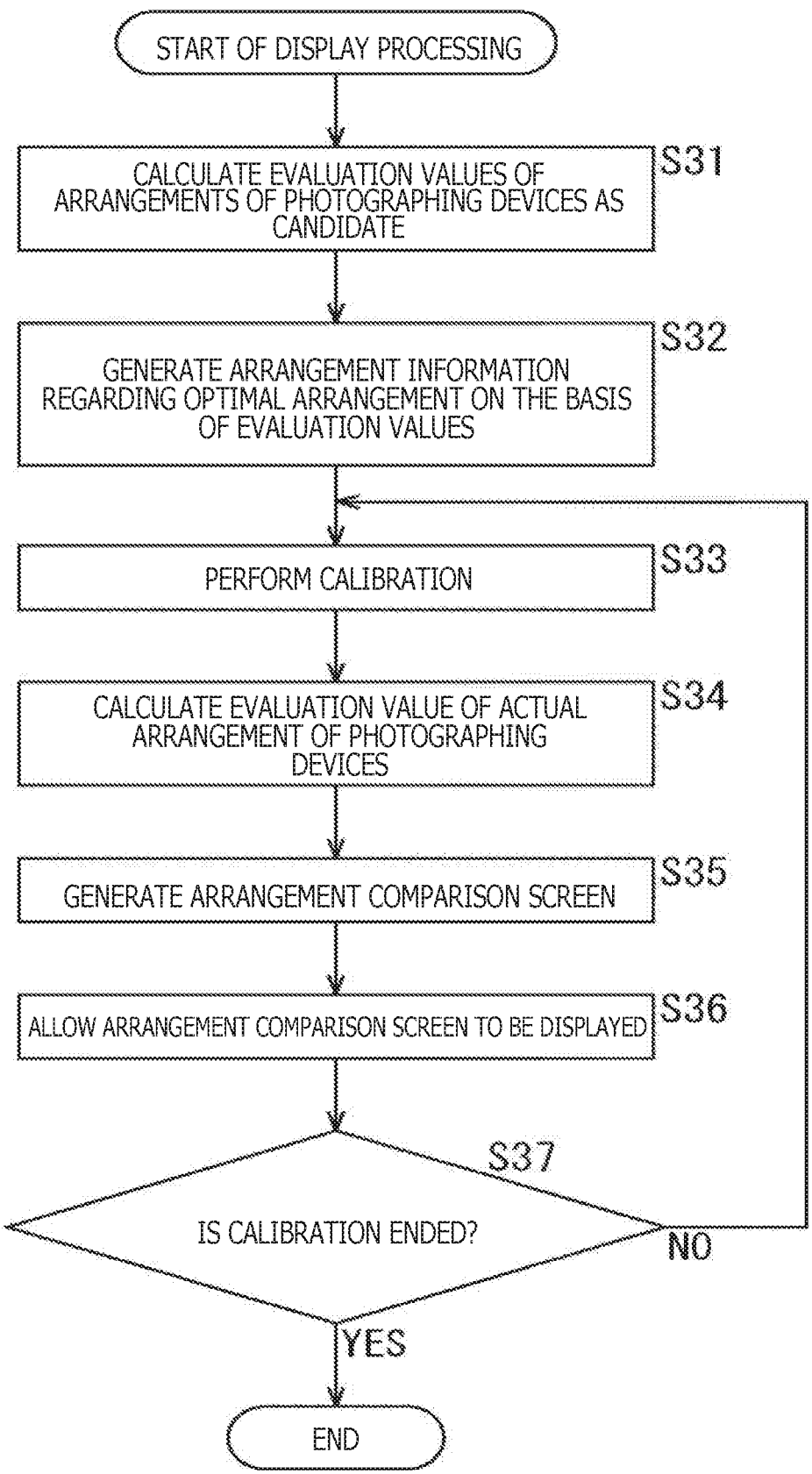
FIG. 19 is a flowchart describing the display processing of the information processing apparatus illustrated in FIG. 17.

FIG. 19 is a flowchart describing the display processing of the information processing apparatus 301 illustrated in FIG. 17.

The processes of steps S31 and S32 illustrated in FIG. 19 are similar to those of steps S11 and S12 illustrated in FIG. 16 and therefore descriptions are omitted.

In step S33, the calibration section 25 performs the calibration on the basis of the two-dimensional image data, depth image data, and internal parameter supplied from the photographing devices 11. Further, the calibration section 25 calculates the external parameter indicating the actual arrangement of each photographing device 11. The calibration section 25 supplies the calculated external parameter of each photographing device 11 to the 3D generation section 26 and the evaluation section 311.

In step S34, the evaluation section 311 calculates the evaluation value of the actual arrangement of each photographing device 11 on the basis of the external parameter of each photographing device 11 supplied from the calibration section 25, and the internal parameter and viewing area information associated with each photographing device 11. The evaluation section 311 supplies, as the actual arrangement information, the external parameter of each photographing device 11 supplied from the calibration section 25 to the display control section 312. At the same time, the evaluation section 311 supplies the evaluation value of the actual arrangement of each photographing device 11 to the display control section 312.

In step S35, the display control section 312 generates the arrangement comparison screen on the basis of the internal parameter, arrangement information, viewing area information, installation area information, evaluation value of the optimum arrangement, actual arrangement information, and evaluation value of the actual arrangement of each photographing device 11 supplied from the arrangement generation section 21.

In step S36, the display control section 312 supplies the arrangement comparison screen to the display section 313 and allows the display section 313 to display the arrangement comparison screen. While viewing the arrangement comparison screen displayed on the display section 313, the photographer corrects arrangements of the photographing devices 11, if necessary. Then, the photographer allows the photographing devices 11 to perform the photographing for calibration again. This process permits the two-dimensional image data and the depth image data to be newly supplied to the calibration section 25.

In step S37, the calibration section 25 determines whether or not to end the calibration, that is, whether or not the two-dimensional image data and the depth image data are newly supplied. If it is determined that the calibration is not ended in step S37, the process returns to step S33. Further, until the calibration is ended, the processes of steps S33 to S37 are repeated.

On the other hand, if it is determined that the calibration is ended in step S37, the process is ended.

In the information processing apparatus 12, after the above-described display processing is performed, the three-dimensional data is generated by the 3D generation section 26.

As described above, the information processing apparatus 301 generates the arrangement information regarding the optimum arrangement of the photographing devices 11 and the actual arrangement information regarding the actual arrangements of the photographing devices 11. Accordingly, for example, the information processing apparatus 301 can display the arrangement comparison screen to the photographer on the basis of the arrangement information and the actual arrangement information. Through this process, the photographer can recognize a difference between the optimum arrangement and actual arrangement of the photographing devices 11. In the result, the photographer can easily correct the arrangements of the photographing devices 11 to the optimum arrangement for the generation of the three-dimensional data. Therefore, the accuracy of the three-dimensional data can be improved.

Note that, in the information processing apparatus 301, the arrangement screen may be displayed before the calibration similarly to the information processing apparatus 12.

Third Embodiment (Configuration Example of Third Embodiment of Information Processing System)

Figure 20:
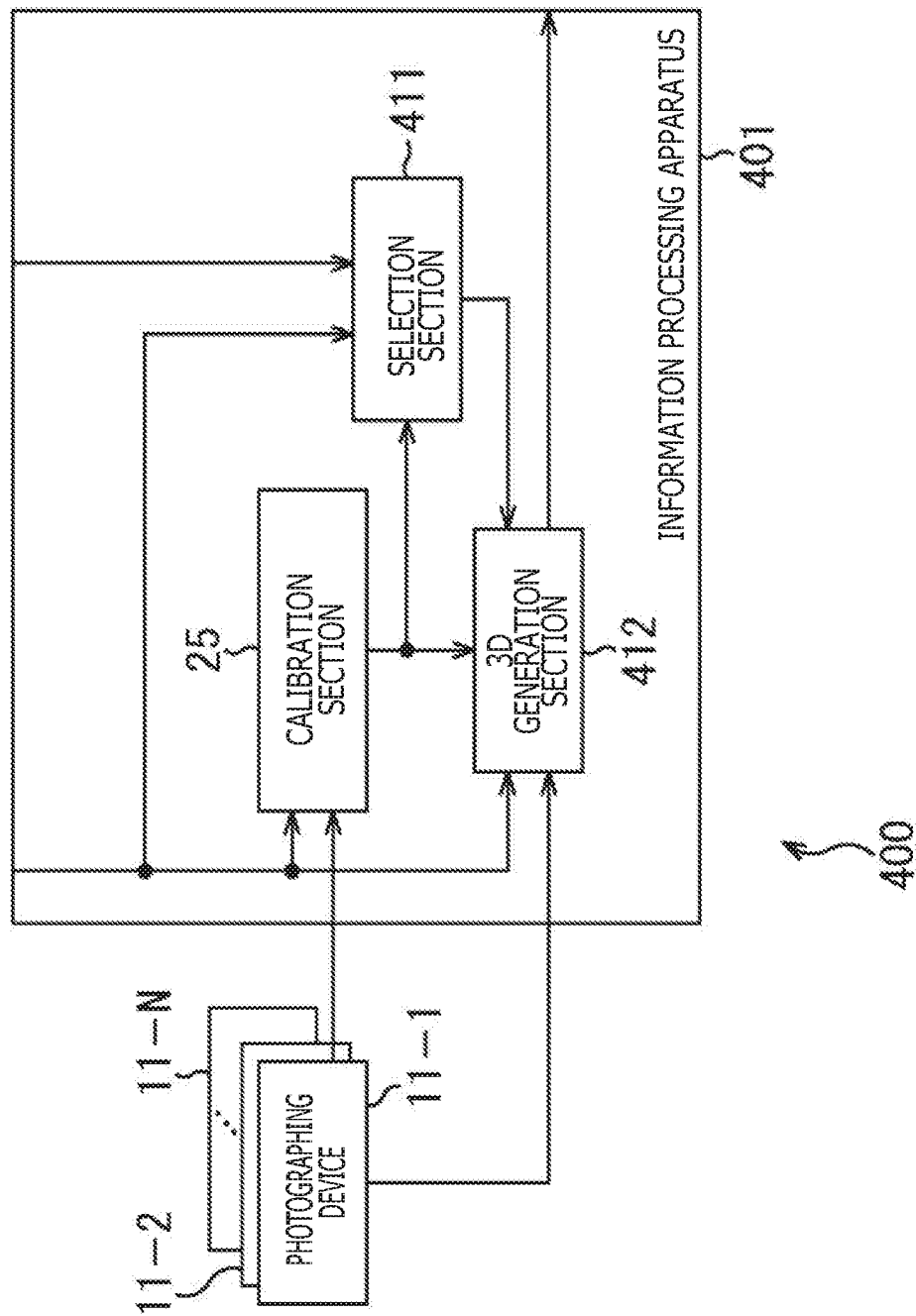
FIG. 20 is a block diagram illustrating a configuration example of a third embodiment of the information processing system to which the present disclosure has been applied.

FIG. 20 is a block diagram illustrating a configuration example of a third embodiment of an information processing system to which the present disclosure has been applied.

In the configuration illustrated in FIG. 20, the same reference sign is assigned to the same configuration as that illustrated in FIG. 1. Overlapping description is appropriately omitted.

The configuration of an information processing system 400 illustrated in FIG. 20 differs from that of the information processing system 10 illustrated in FIG. 1 in that an information processing apparatus 401 is formed in place of the information processing apparatus 12. When the three-dimensional data is generated after the calibration, the information processing system 400 selects the photographing device 11 in the optimum arrangement from among the photographing devices 11-1 to 11-N. Further, the information processing system 400 generates the three-dimensional data by using the two-dimensional image data etc. photographed by the selected photographing device 11. Note that arrangements of the photographing devices 11 are the surrounding arrangement.

The information processing apparatus 401 includes the calibration section 25, a selection section 411, and a 3D generation section 412.

To the selection section 411, the internal parameter and viewing area information associated with each photographing device 11 are input. At the same time, the external parameter of each photographing device 11 calculated by the calibration section 25 is input to the selection section 411. The selection section 411 calculates, in each photographing device 11, the evaluation values of the actual arrangements of the photographing devices 11, which corresponds to the generation of the three-dimensional data, on the basis of the internal parameter, external parameter, and viewing area information associated with each photographing device 11.

The selection section 411 selects the photographing devices 11 in which the evaluation value is equal to or larger than the threshold from among the photographing devices 11-1 to 11-N on the basis of the evaluation value of the actual arrangement of each photographing device 11. Then, the selection section 411 sets the selected photographing devices 11 to the photographing devices 11 (hereinafter, referred to as an effective photographing device) corresponding to the two-dimensional image data and depth image data used to generate the three-dimensional data in the 3D generation section 412.

The selection section 411 supplies photographing device specification information for specifying the effective photographing device and the external parameter to the 3D generation section 412. For example, the photographing device specification information may be an ID of the effective photographing device in IDs peculiar to each photographing device 11 or may be information for associating the ID peculiar to each photographing device 11 with an effect or non-effect.

To the 3D generation section 412, the internal parameter of each photographing device 11 is input. In addition, to the 3D generation section 412, the two-dimensional image data and depth image data obtained by the photographing for generating the three-dimensional data of each photographing device 11 are input.

The 3D generation section 412 generates the three-dimensional data on the basis of the two-dimensional image data, depth image data, external parameter, and internal parameter of the effective photographing device specified by the photographing device specification information supplied from the selection section 411. The 3D generation section 412 outputs the generated three-dimensional data.

(Configuration Example of Evaluation Section)

Figure 21:
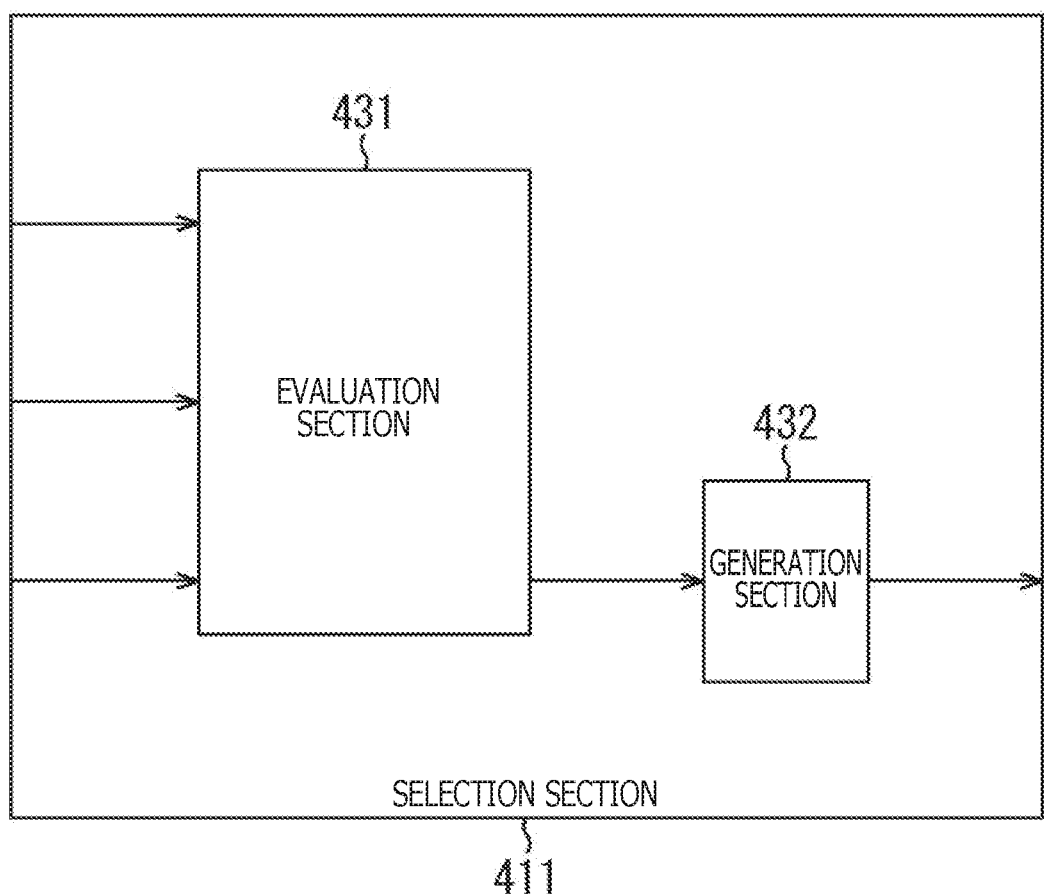
FIG. 21 is a block diagram illustrating a configuration example of a selection section illustrated in FIG. 20.

FIG. 21 is a block diagram illustrating a configuration example of the selection section 411 illustrated in FIG. 20.

The selection section 411 illustrated in FIG. 21 includes an evaluation section 431 and a generation section 432.

The evaluation section 431 calculates the evaluation value in each photographing device 11 on the basis of the internal parameter, external parameter, and viewing area information associated with each photographing device 11 so that the evaluation values of the photographing devices 11 in which the field angle includes the whole viewing area become larger than the evaluation values of the photographing devices 11 in which the field angle does not include at least a portion of the viewing area.

That is, the three-dimensional data with high accuracy cannot be generated by using the two-dimensional image data etc. photographed by the photographing devices 11 in which the field angle does not include at least a portion of the viewing area. Accordingly, the photographing devices 11 in which the field angle does not include at least a portion of the viewing area are not suitable for the generation of the three-dimensional data. Therefore, the evaluation section 431 makes the evaluation values of the photographing devices 11 in which the field angle does not include at least a portion of the viewing area smaller than the evaluation values of the photographing devices 11 in which the field angle includes the whole viewing area.

Specifically, the evaluation section 431 divides a surface of the viewing area into a plurality of grids similarly to the division section 121 illustrated in FIG. 8. Further, the evaluation section 431 projects each grid on each photographing device 11 and generates the projection line information similarly to the projection section 122. The evaluation section 431 determines whether or not the projection lines from all the grids to the photographing devices 11 are present within the field angles of the photographing devices 11, in each photographing device 11 on the basis of the projection line information.

Then, if it is determined that the projection lines from all the grids to the photographing devices 11 are present within the field angles of the photographing devices 11, the evaluation section 431 sets the evaluation value of the photographing device 11 to one. On the other hand, if it is determined that the projection lines from at least one grid to the photographing devices 11 are not present within the field angles of the photographing devices 11, the evaluation section 431 sets the evaluation value of the photographing device 11 to zero. The evaluation section 431 supplies the evaluation value of each photographing device 11 to the generation section 432.

The generation section 432 selects, as the effective photographing device, the photographing devices 11 in which the evaluation value is equal to or larger than the threshold (one in the case of the third embodiment) from among the photographing devices 11-1 to 11-N on the basis of the evaluation value of each photographing device 11 supplied from the evaluation section 431. That is, the generation section 432 selects, as the effective photographing device, the photographing devices 11 in a position suitable for the generation of the three-dimensional data in which the field angle includes the whole viewing area from among the photographing devices 11-1 to 11-N. The generation section 432 generates the photographing device specification information regarding the effective photographing device and supplies the information to the 3D generation section 412 illustrated in FIG. 20.

(Example of Effective Photographing Device)

Figure 22:
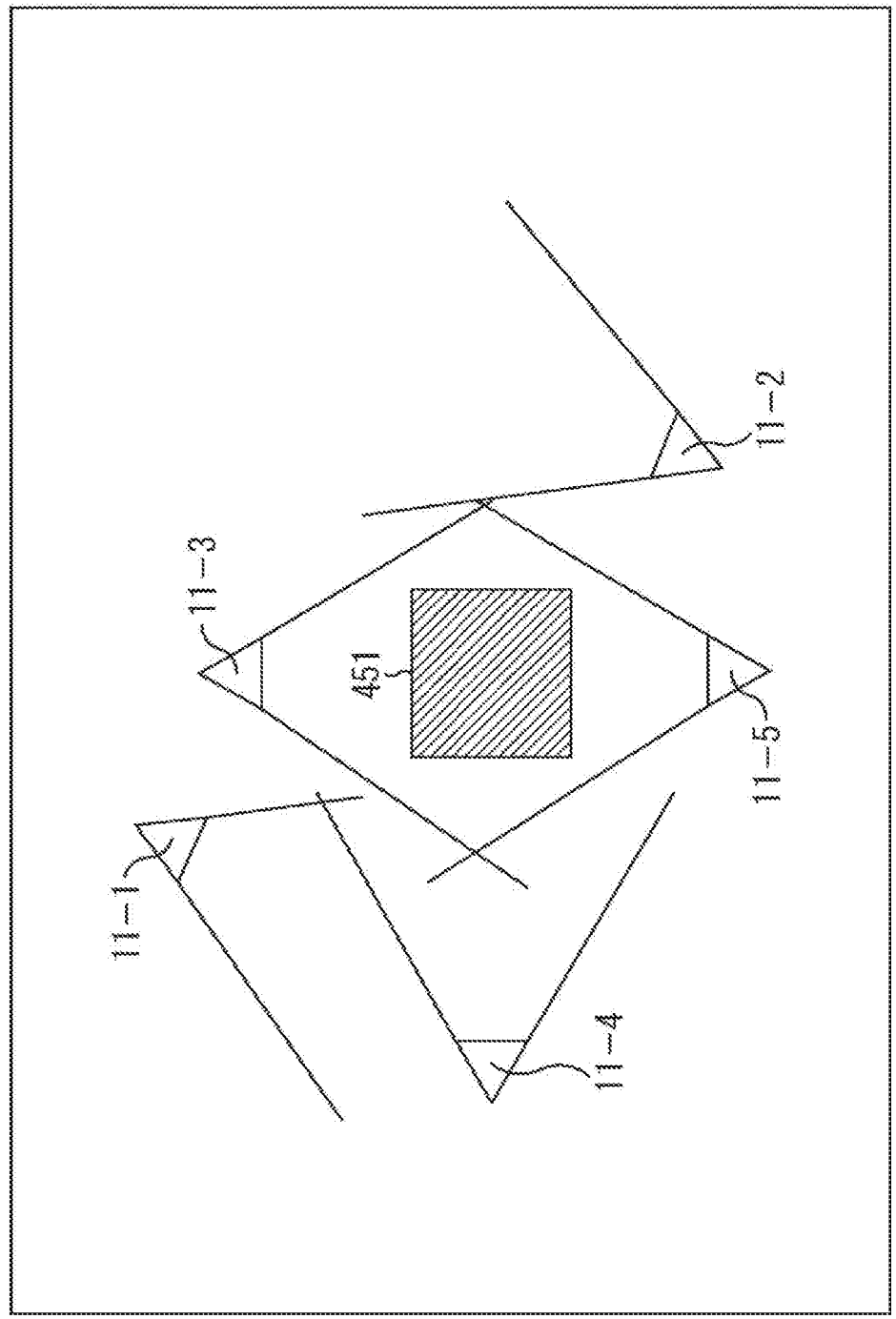
FIG. 22 is a diagram illustrating an example of an effective photographing device.

FIG. 22 is a diagram illustrating an example of the effective photographing device.

In an example illustrated in FIG. 22, the number N of the photographing devices 11 is five. Further, the field angles of the photographing devices 11-1 and 11-2 do not include the whole viewing area 451 and the field angles of the photographing devices 11-3 to 11-5 include the whole viewing area 451

In this case, the evaluation section 431 sets the evaluation values of the photographing devices 11-3 to 11-5 in which the field angle includes the whole viewing area 451 to one. On the other hand, the evaluation section 431 sets the evaluation values of the photographing devices 11-1 and 11-2 in which the field angle does not include the whole viewing area 451 to zero. Accordingly, the generation section 432 selects, as the effective photographing device, the photographing devices 11-3 to 11-5 in which the evaluation value is equal to or larger than one, from among the photographing devices 11-1 to 11-5.

(Descriptions of Processing of Information Processing Apparatus)

Figure 23:
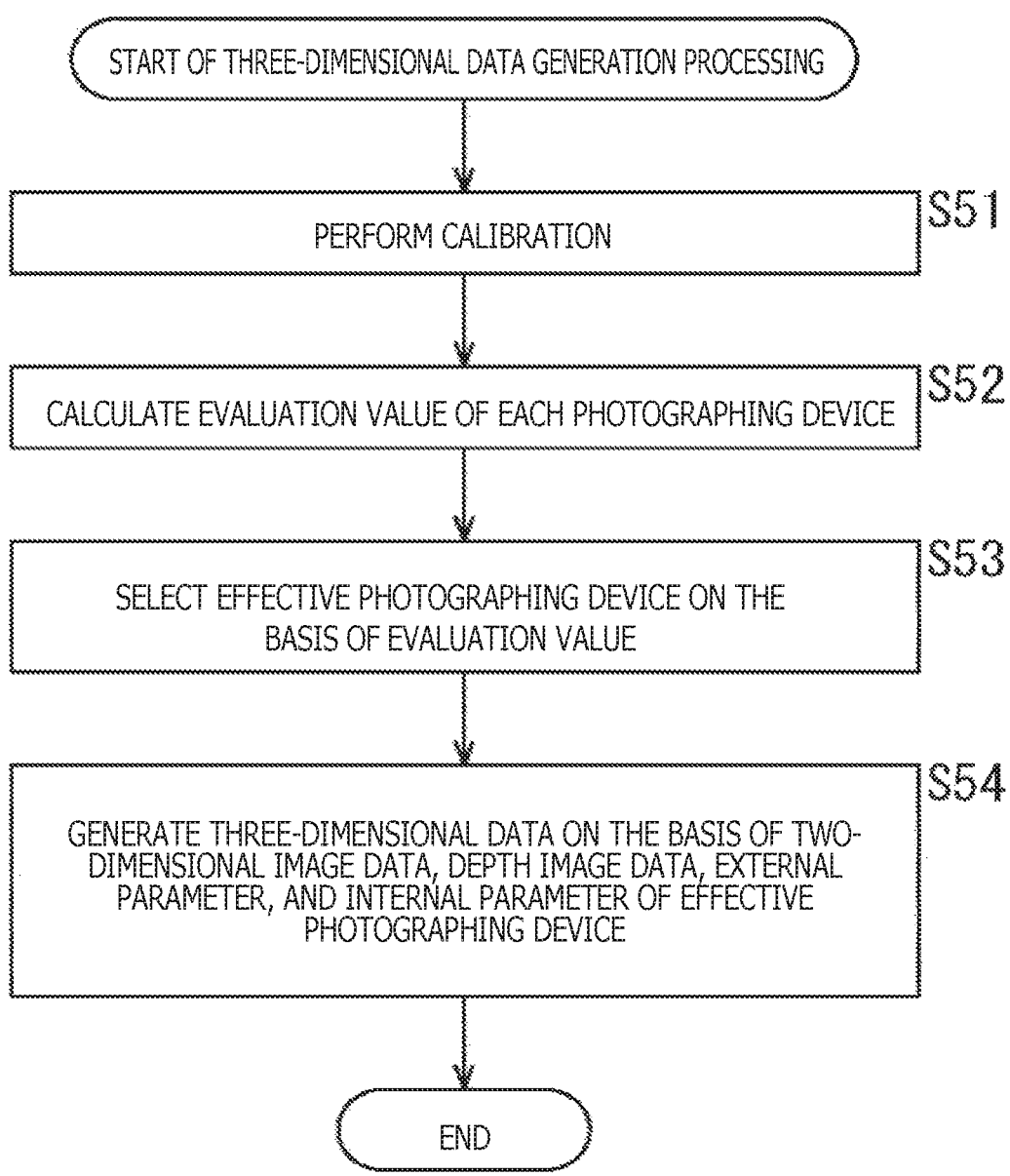
FIG. 23 is a flowchart describing three-dimensional data generation processing of the information processing apparatus illustrated in FIG. 20.

FIG. 23 is a flowchart describing three-dimensional data generation processing of the information processing apparatus 401 illustrated in FIG. 20.

In step S51 illustrated in FIG. 23, the calibration section 25 performs the calibration on the basis of the two-dimensional image data, depth image data, and internal parameter supplied from the photographing devices 11 and calculates the external parameter of each photographing device 11. The calibration section 25 supplies the calculated external parameter of each photographing device 11 to the 3D generation section 26.

In step S52, the evaluation section 431 (FIG. 21) of the selection section 411 calculates the evaluation value of each photographing device 11 on the basis of the internal parameter, external parameter, and viewing area information associated with each photographing device 11. The evaluation section 431 supplies the evaluation value of each photographing device 11 to the generation section 432.

In step S53, the generation section 432 selects the photographing devices 11 in which the evaluation value is equal to or larger than the threshold as the effective photographing device on the basis of the evaluation value of each photographing device 11 supplied from the evaluation section 431. The generation section 432 generates the photographing device specification information regarding the effective photographing device and supplies the information to the 3D generation section 412.

In step S54, the 3D generation section 412 generates the three-dimensional data on the basis of the two-dimensional image data, depth image data, external parameter, and internal parameter of the effective photographing device specified by the photographing device specification information. The 3D generation section 412 outputs the generated three-dimensional data.

As described above, the information processing apparatus 401 calculates the evaluation value of the arrangement of each photographing device 11, which corresponds to the generation of the three-dimensional data, in each photographing device 11 on the basis of the arrangement of each photographing device 11. Accordingly, on the basis of the evaluation value of each photographing device 11, for example, the information processing apparatus 401 can select the photographing device 11 in the optimum arrangement for the generation of the three-dimensional data, and further use only information regarding the photographing device 11 for the generation of the three-dimensional data. Therefore, the photographer does not change the arrangements of the photographing devices 11 but can easily set the arrangements of the photographing devices 11 used to generate the three-dimensional data to the optimum arrangement for the generation of the three-dimensional data.

Note that the information processing apparatus 401 includes the display control section and the display section. Further, the information processing apparatus 401 may generate and display a screen indicating the actual arrangements of the photographing devices 11 similarly to the arrangement screen on the basis of the external parameter, internal parameter, installation area information, viewing area information, and evaluation value of the photographing devices 11.

<Another Setting Method of Viewing Area>

FIG. 24 is a diagram illustrating an example of another setting method of the viewing area.

In the example illustrated in FIG. 24, the number N of the photographing devices 11 is eight.

In the descriptions, the whole area of a square pole including the photographic object corresponding to the generated three-dimensional data has a size capable of including the whole area within the field angle of each photographing device 11 subjected to the surrounding arrangement and the area is set to the viewing area.

However, as illustrated in FIG. 24, in the case where an area 471 of the square pole including the photographic object corresponding to the generated three-dimensional data is large and the whole area 471 cannot be included within the field angle of each photographing device 11 subjected to the surrounding arrangement, the area 471 is divided into areas having a size capable of including the whole area 471 within the field angle of each photographing device 11. Then, the divided areas are set to the viewing area. In the example illustrated in FIG. 24, the area 471 is divided into three and set to the viewing areas 481 to 483.

In this case, even the area 472 in which the photographing devices 11-1 to 11-8 are installed is divided in response to the viewing areas 481 to 483 and set to the installation areas 491 to 493.

Further, in the first embodiment and the second embodiment, processing is performed in each pair of the viewing area 481 and the installation area 491, the viewing area 482 and the installation area 492, and the viewing area 483 and the installation area 493. Further, in the third embodiment, the three-dimensional data generation processing is performed to the respective viewing areas 481 to 483.

Fourth Embodiment (Description of Computer to Which Present Disclosure Has Been Applied)

The series of above-described processing can be executed by hardware or by software. In the case where the series of processing is executed by software, a program included in the software is installed into a computer. Here, the computer may be a computer embedded in special hardware or may be, for example, a general personal computer which can execute various functions by installation of various programs.

FIG. 25 is a block diagram illustrating a configuration example of hardware of a computer to execute the series of processing by a program.

In the computer 600, a CPU (Central Processing Unit) 601, a ROM (Read Only Memory) 602, and a RAM (Random Access Memory) 603 are connected to each other by a bus 604.

To the bus 604, an input/output interface 605 is further connected. To the input/output interface 605, an input section 606, an output section 607, a storage section 608, a communication section 609, and a drive 610 are connected.

The input section 606 includes a keyboard, a mouse, a microphone, or the like. The output section 607 includes a display, a speaker, or the like. The storage section 608 includes a hard disk, a nonvolatile memory, or the like. The communication section 609 includes a network interface or the like. The drive 610 drives a removable medium 611 such as a magnetic disk, an optical disk, a magneto optical disk, or a semiconductor memory.

In the computer 600 configured in such a manner, the CPU 601 loads, for example, a program stored in the storage section 608 into the RAM 603 through the input/output interface 605 and the bus 604 and executes the program, whereby the series of processing is performed.

For example, the program executed by the computer 600 (CPU 601) is recorded in the removable medium 611, which functions as a package medium or the like, when being provided. Also, the program can be provided through a wired or wireless transmission medium such as a local area network, the Internet, or a digital satellite broadcast.

In the computer 600, by mounting the removable medium 611 to the drive 610, the program can be installed into the storage section 608 through the input/output interface 605. Also, the program can be received in the communication section 609 through the wired or wireless transmission medium and can be installed into the storage section 608. In addition, the program can be previously installed into the ROM 602 or the storage section 608.

Note that the program executed by the computer 600 may be a program in which processing is performed chronologically in an order described in this specification or may be a program in which processing is performed in parallel or at necessary timing such as when a call is performed.

Further, in this specification, a system means a set of a plurality of components (such as a device or a module (part)) and does not take into account whether or not all the components are present in the same housing. Therefore, the system may be any of a plurality of devices stored in separate housings and connected through a network, and a single device in which a plurality of modules are stored in a single housing.

Incidentally, the advantageous effects described in this specification are strictly illustrative and are not limited thereto, and there may be advantageous effects other than those described in this specification.

Further, the embodiments of the present disclosure are not limited to the embodiments described above, and various changes can be made without departing from the spirit of the present disclosure.

Incidentally, the present disclosure may also take the following configurations.

(1)
An information processing apparatus including: an evaluation section configured to calculate an evaluation value of an arrangement for generation of three-dimensional data on a basis of the arrangements of a plurality of photographing devices that photograph two-dimensional image data used to generate the three-dimensional data of a photographic object.

(2)
The information processing apparatus according to (1) above, in which
the evaluation section calculates the evaluation values of the arrangements,
the information processing apparatus further including:
a display control section configured to allow a display section to display information indicating the arrangement corresponding to the evaluation value indicating a highest evaluation in the evaluation values of the arrangements calculated by the evaluation section.

(3)
The information processing apparatus according to (1) above, further including:
an arrangement calculation section configured to calculate the arrangement on a basis of the two-dimensional image data; and
a display control section configured to allow a display section to display information indicating the arrangement calculated by the arrangement calculation section.

(4)
The information processing apparatus according to (1) above, further including:
a display control section configured to allow a display section to display the evaluation value of the arrangement calculated by the evaluation section.

(5)
The information processing apparatus according to (1) above, further including:
a display control section configured to allow a display section to display information indicating a field angle of the photographing device in the arrangement.

(6)
The information processing apparatus according to any one of (1) to (5) above, in which
the evaluation section is configured so as to calculate the evaluation value on a basis of field angles of the plurality of photographing devices.

(7)
The information processing apparatus according to (6) above, in which
the plurality of photographing devices are arranged around an area of the photographic object, and
the evaluation section is configured so as to calculate the evaluation value on a basis of an area to be intersected upon projecting the field angles of the plurality of photographing devices on three-dimensional coordinates and the area of the photographic object.

(8)
The information processing apparatus according to (6) above, in which
the plurality of photographing devices are arranged within an area of the photographic object, and
the evaluation section is configured so as to calculate the evaluation value on a basis of areas within the field angles of the plurality of photographing devices in the area of the photographic object.

(9)
The information processing apparatus according to (1) or (3) above, further including:
a selection section configured to select the photographing device corresponding to the two-dimensional image data used to generate the three-dimensional data from among the plurality of photographing devices on a basis of the evaluation value, in which
the evaluation section is configured so as to calculate the evaluation value of the arrangement in each photographing device.

(10)
The information processing apparatus according to (9) above, in which
the plurality of photographing devices are arranged around an area of the photographic object,
the evaluation section calculates the evaluation value of the photographing device so that the evaluation of the photographing device in which the field angle includes the area of the photographic object becomes higher than the evaluation of the photographing device in which the field angle does not include the area of the photographic object in each photographing device, and
the selection section is configured so as to select the photographing device in which the field angle includes the area of the photographic object.

(11)
An information processing method including:
an evaluation step of allowing an information processing apparatus to calculate an evaluation value of an arrangement for generation of three-dimensional data on a basis of the arrangements of a plurality of photographing devices that photograph two-dimensional image data used to generate the three-dimensional data of a photographic object.

REFERENCE SIGNS LIST 11-1 to 11-N Photographing device, 12 Information processing apparatus, 22 Display control section, 23 Display section, 25 Calibration section, 82 Evaluation section, 141 Viewing area, 145 Convex hull, 241 Area, 271-1 to 271-4 Photographing device image, 272 Field angle image, 263 Evaluation value display section, 301 Information processing apparatus, 311 Evaluation section, 312 Display control section, 313 Display section, 333 Evaluation value display section, 341-1 to 341-4 Actual photographing device image, 401 Information processing apparatus, 431 Evaluation section, 432 Generation section

The invention claimed is:

1. An information processing apparatus, comprising:
an evaluation section configured to:
calculate, based on a plurality of arrangements of a plurality of photographing devices, an evaluation value of an arrangement of the plurality of arrangements of the plurality of photographing devices, wherein
each of the plurality of photographing devices photographs two-dimensional image data to generate three-dimensional data of a photographic object,
the plurality of photographing devices is around a first area of the photographic object,
the generation of the three-dimensional data is based on the calculated evaluation value,
the evaluation value of the arrangement is calculated for each photographing device of the plurality of photographing devices, and
the evaluation value of a first photographing device of the plurality of photographing devices in which a field angle includes the first area of the photographic object is higher than the evaluation value of a second photographing device of the plurality of photographing devices in which the field angle excludes the first area of the photographic object; and
a selection section configured to select, from the plurality of photographing devices, the first photographing device based on the evaluation value.

2. The information processing apparatus according to claim 1, wherein
the evaluation section is further configured to calculate a plurality of evaluation values of the plurality arrangements,
the information processing apparatus further comprises a display control section configured to control a display section to display information indicating the arrangement corresponding to the evaluation value, and
the evaluation value indicates a highest evaluation value among the plurality of evaluation values of the plurality of arrangements.

3. The information processing apparatus according to claim 1, further comprising:
an arrangement calculation section configured to calculate the arrangement based on the two-dimensional image data; and
a display control section configured to control a display section to display information indicating the arrangement calculated by the arrangement calculation section.

4. The information processing apparatus according to claim 1, further comprising a display control section configured to control a display section to display the evaluation value of the arrangement.

5. The information processing apparatus according to claim 1, further comprising a display control section configured to control a display section to display information indicating the field angle of a photographing device of the plurality of photographing devices in the arrangement.

6. The information processing apparatus according to claim 1, wherein the evaluation section is further configured to calculate the evaluation value of the arrangement based on field angles of the plurality of photographing devices.

7. The information processing apparatus according to claim 6, wherein
the evaluation section is further configured to calculate the evaluation value of the arrangement based on a second area to be intersected and the first area of the photographic object, and
the second area is intersected based on projection of the field angles of the plurality of photographing devices on three-dimensional coordinates.

8. The information processing apparatus according to claim 6, wherein
the evaluation section is further configured to calculate the evaluation value of the arrangement based on a second area within each of the field angles of the plurality of photographing devices in the first area of the photographic object.

9. An information processing method, comprising:
in an information processing apparatus that includes an evaluation section and a selection section:
calculating, by the evaluation section, based on a plurality of arrangements of a plurality of photographing devices, an evaluation value of an arrangement of the plurality of arrangements of the plurality of photographing devices, wherein
each of the plurality of photographing devices photographs two-dimensional image data to generate three-dimensional data of a photographic object,
the plurality of photographing devices is around an area of the photographic object,
the generation of the three-dimensional data is based on the calculated evaluation value,
the evaluation value of the arrangement is calculated for each photographing device of the plurality of photographing devices, and
the evaluation value of a first photographing device of the plurality of photographing devices in which a field angle includes the area of the photographic object is higher than the evaluation value of a second photographing device of the plurality of photographing devices in which the field angle excludes the area of the photographic object; and
selecting, by the selection section, from the plurality of photographing devices, the first photographing device based on the evaluation value.

* * * * *